(12) United States Patent
Tsuchinaga et al.

(10) Patent No.: US 7,650,280 B2
(45) Date of Patent: Jan. 19, 2010

(54) VOICE PACKET LOSS CONCEALMENT DEVICE, VOICE PACKET LOSS CONCEALMENT METHOD, RECEIVING TERMINAL, AND VOICE COMMUNICATION SYSTEM

(75) Inventors: Yoshiteru Tsuchinaga, Yokohama (JP); Yasuji Ota, Kawasaki (JP); Masanao Suzuki, Kawasaki (JP); Masakiyo Tanaka, Kawasaki (JP); Miyuki Shirakawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 605 days.

(21) Appl. No.: 11/065,416

(22) Filed: Feb. 24, 2005

(65) Prior Publication Data
US 2005/0166124 A1    Jul. 28, 2005

Related U.S. Application Data

(63) Continuation of application No. PCT/JP03/00894, filed on Jan. 30, 2003.

(51) Int. Cl.
    *G10L 11/04* (2006.01)
    *G10L 19/00* (2006.01)
(52) U.S. Cl. ........................ 704/207; 704/201
(58) Field of Classification Search ................ 704/207, 704/219–223, 201
    See application file for complete search history.

(56) References Cited

U.S. PATENT DOCUMENTS 5,907,822 A * 5/1999 Prieto, Jr. .................... 704/202

| 5,929,921 A | 7/1999 | Taniguchi et al. |
| 2002/0065648 A1 | 5/2002 | Amano |
| 2003/0220787 A1* | 11/2003 | Svensson et al. ............ 704/207 |
| 2004/0010407 A1 | 1/2004 | Kovesi et al. |

FOREIGN PATENT DOCUMENTS

| JP | 5-268685 | 10/1993 |
| JP | 8-256131 | 10/1996 |
| JP | 2000-59391 | 2/2000 |
| JP | 2001-228896 | 8/2001 |
| JP | 2002162998 | 6/2002 |

(Continued)

OTHER PUBLICATIONS

European Summons to Attend Oral Proceedings pursuant to Rule 115(1) EPC, dated Mar. 7, 2008, from the corresponding European Application.

(Continued)

*Primary Examiner*—Angela A Armstrong
(74) *Attorney, Agent, or Firm*—Katten Muchin Rosenman LLP

(57) ABSTRACT

In a voice packet communication system, a voice packet loss concealment device compensates for the deterioration of voice quality due to voice packet loss. In the device, a detecting section detects a loss of a voice packet and outputting information; an estimating section estimates the voice characteristics of the lost segment using a pre-loss voice packet received before the lost segment or a post-loss voice packet received after the lost segment; a pitch signal generating section generates a pitch signal having the voice characteristics; and a lost packet generating section outputs the pitch signal generated by the pitch signal generating section, with the voice characteristics estimated by the estimating section, which allows abnormal noise and feeling of mute, subjective deterioration of naturalness and continuity to be improved, and the voice packet loss concealment to be further improved.

18 Claims, 14 Drawing Sheets

FOREIGN PATENT DOCUMENTS

| WO | 99/66494 | | 12/1999 |
|---|---|---|---|
| WO | WO 99/66494 | * | 12/1999 |
| WO | 02/07061 | | 1/2002 |
| WO | 02/21515 | | 3/2002 |

OTHER PUBLICATIONS

Decision of Rejection dated Oct. 7, 2008, for corresponding Japanese Patent Application 2004-567529.

Colin Perkins, et al.,"A Survey of Packet Loss Recovery Techniques for Streaming Audio", Sep./Oct. 1998, pp. 40-48, IEEE Networks.

International Search Report dated May 20, 2003.

Supplementary European Search Report dated Jun. 11, 2007, from the corresponding European Application.

Notice of Rejection mailed Jun. 19, 2007, from the corresponding Japanese Application.

"Pulse code modulation (PCM) of voice frequencies" ITU-T Standard in Force, International Telecommunication Union, Geneva, Sep. 1, 1999.

* cited by examiner

VOICE PACKET LOSS CONCEALMENT DEVICE, VOICE PACKET LOSS CONCEALMENT METHOD, RECEIVING TERMINAL, AND VOICE COMMUNICATION SYSTEM

CROSS-REFERENCE TO RELATED APPLICATIONS

This application is a continuation of International Application PCT/JP2003/00894 was filed on Jan. 30, 2003, the contents of which are herein wholly incorporated by reference.

TECHNICAL FIELD

The present invention relates to a voice packet loss concealment device, a voice packet loss concealment method, a receiving terminal, and a voice communication system, which are suitable for use in compensating for the deterioration of voice quality caused by voice packet loss in, for example, a receiving terminal in a voice packet communication system in which voice data is packetized and transmitted.

BACKGROUND ART

In general, it is often the case that transmission rate is used as a criterion for evaluating the quality of access networks. Classifying networks based on transmission band knows band assurance type and best effort type ones. In a band assurance type network, a network operator always assures users of a constant transmission band regardless of the number of users, while in a best effort type network not always assure users of a constant transmission band.

In recent years due to the explosive growth of the Internet, VoIP (Voice over IP) communication system, in which voice packets containing packetized voice data are transmitted via an IP (Internet Protocol) network, has been introduced. Here, since IP network is a best effort type one, the transmission band of voice packets transmitted from a transmitting terminal to a receiving terminal is not assured and there may occur a transmission delay fluctuation due to, for example, congestion in transmission channel. That is, voice packets transmitted regularly from the transmitting terminal may arrive at the receiving terminal irregularly.

Meanwhile, the receiving terminal accumulates received voice packets sequentially into a receive-packet buffer (receive buffer), and then a voice reproducing device provided in the receiving terminal receives data for one voice packet to reproduce the voice. An example of data for one voice packet is N (representing a natural number) samples of PCM (Pulse Coded Modulation) data.

Also, it is necessary for the receiving terminal to receive voice packets completely to maintain high voice quality. Therefore, voice packet delay may cause the loss or lack of a voice packet to be received, resulting in the deterioration of voice quality. Thus, in general, receive-packet buffers of receiving terminals are adapted to absorb voice packet transmission delay fluctuation.

FIG. 12 is an illustrative view of voice packet transmission delay fluctuation. A receive-packet buffer 50 shown in FIG. 12 receives voice packets that arrive on an irregular interval and accumulates each voice packet at the point, and then outputs the accumulated voice packets to a voice reproducing device 51 regularly or on a constant interval. Then, the voice reproducing device 51 reads out voice packets regularly to reproduce the voice. Thus, voice packets that arrive at the receiving terminal irregularly are accumulated into the receive-packet buffer 50 temporarily, which allows transmission delay fluctuation to be absorbed to compensate for the impact due to transmission delay.

However, an excessive increase in the capacity of the receive-packet buffer 50 for absorbing transmission delay causes an increase in the accumulation time in the receive-packet buffer 50 and thereby call delay, resulting in a trouble in the interactive conversation. Therefore, the capacity of the receive-packet buffer 50 has a limitation. Also, voice packets having a transmission delay more than the capacity of the receive-packet buffer 50 are too late for readout. Consequently, the voice reproducing device 51 reproduces voice with some voice packets being lost, resulting in the deterioration of voice quality.

In addition to transmission delay fluctuation, there may also occur a voice packet loss in an IP network.

Both FIGS. 13(a) and 13(b) are illustrative views of a voice packet loss concealment method. Partial loss in a voice packet stream as shown in FIG. 13(a) causes the deterioration of voice quality such as voice interruption. Thus, the receiving terminal inserts a voice packet for concealing the loss (hereinafter referred to as "loss concealment packet") into a lost segment (packet loss segment) shown in FIG. 13(b), and thereby suppresses the deterioration of voice quality. That is, the receiving terminal replaces a packet that is meant to be received originally with a loss concealment packet, and the voice reproducing device 51 reproduces the voice using the loss concealment packet.

As one of the voice packet loss concealment method above, ITU-T (International Telecommunication Union) recommendation G.711 Appendix I (hereinafter referred to as "publicly known document 1") has been known. In the packet loss concealment method described in the publicly known document 1 is used pitch cycle, i.e., one of the physical characteristics of voice.

Pitch cycle represents the vibration cycle of vocal cords, which corresponds to the interval between "peaks" (or "troughs") of the repeating unit of a repeating waveform as shown, for example, in FIG. 10(a). As known well, voiced sounds such as vowels are produced by the vibration of vocal cords, and the vibration of vocal cords has a constant cycle. For this reason, the waveform of voiced sounds appears at a substantially constant cycle repeatedly. Further, the vibration cycle of vocal cords fluctuates slightly, which is observed as a pitch cycle fluctuation (pitch fluctuation).

The voice packet loss concealment method described in the publicly known document 1 above comprises the following steps (X1) to (X3):

(X1) extracting a pitch pattern using a voice signal obtained from a normal voice packet that is received immediately before a lost voice packet, and then replacing the portion corresponding to the lost voice packet with the extracted pitch pattern repeatedly to generate a loss concealment signal;

(X2) at the connection with a normal voice immediately after the lost voice packet, applying a weighting addition to the loss concealment signal and the normal signal; and (X3) in the case of a consecutive voice packet loss, attenuating the loss concealment signal gradually.

However, the method as described in (X1), in which the extracted pitch pattern is simply repeated at a pitch cycle, cannot follow the pitch cycle fluctuation that is originally contained in the voice, causing a phase shift. Also in the case as described in (X2) where the weighting addition is applied at the connection with the normal voice, there may occur an abnormal noise due to pitch mismatch at the connection with the normal voice. Further, in the case as described in (X3) where voice packet loss occurs consecutively, there occurs a feeling of mute auditorily due to gradual attenuation of the loss concealment signal.

An example of a method for solving the phase shift, abnormal noise and feeling of mute above is disclosed in Japanese Patent Laid-Open No. 2001-228896 (hereinafter referred to as "publicly known document 2"). An alternative replacement method for lost voice packet disclosed in the publicly known document 2 comprises the following steps (Y1) to (Y3)

(Y1) estimating the pitch cycle fluctuation and the signal power fluctuation using voice data received normally immediately before a loss;

(Y2) Generating a loss concealment signal with the pitch cycle fluctuation and the power fluctuation estimated based on a pitch pattern that is extracted from the signal immediately before the lost voice packet being added thereto; and (Y3) at the connection with a normal voice immediately after the lost voice packet, applying a weighting addition to the loss concealment signal and the normal signal.

The alternative replacement method for lost voice packet described in the publicly known document 2 generates the loss concealment signal in consideration of the pitch fluctuation and the signal power fluctuation and thereby allows the problems of the publicly known document 1 to be solved, the method also being adapted to estimate the pitch fluctuation and the signal power fluctuation of the lost segment using a preceding voice packet before the lost voice packet.

FIG. 14 is an illustrative view of a voice packet estimation method using preceding voice packets. Among segments (packet segments) 1 to 5 shown in FIG. 14, a receiving terminal receives voice packets normally in the segments 1 to 4. Here, in the case of a voice packet loss in the segment 5, the receiving terminal generates a loss concealment packet using the voice packets in the segments 1 to 4. To be concrete, the receiving terminal estimates the pitch fluctuation and the signal power fluctuation of a loss concealment packet to be inserted into the segment 5 to generate the loss concealment packet, and then inserts the generated loss concealment packet into the segment 5. Therefore, this estimation method utilizes the assumption (presumption) that the last (preceding) fluctuation distribution will be continued as it is.

The estimation method above allows a certain level of accurate estimation when the voice fluctuates gradually in the voice packet lost segments 1 to 5. However, when there are many lost segments or a long segment, or the voice changes drastically in a lost segment corresponding to the start point or end point of a voice, it is impossible to make an accurate voice packet estimation, and the problems of the publicly known document 1 cannot be improved sufficiently.

Meanwhile, a method for interpolating a lost segment with a voice packet is disclosed in Japanese Patent Laid-Open No. 2000-59391 (hereinafter referred to as "publicly known document 3"). In the method as described in the publicly known document 3, when two or more temporary packets from a transmitting terminal are extracted in a predetermined combination with being separated by a predetermined interval and received by a voice packet receiving terminal as voice packets via an asynchronous digital communication network, each temporary packet contained in a lost packet can easily be reproduced by interpolating the previous and next temporary packets stored temporarily.

However, the interpolation method as described in the publicly known document 3 requires both transmitting and receiving terminals, resulting in an increase in cost.

Accordingly, the prior arts fail to improve the voice quality even in the case of a drastic voice change, and that with a relatively low cost.

The present invention has been made in view of the above-described problems and is intended to provide a voice packet loss concealment device, a voice packet loss concealment method, a receiving terminal, and a voice communication system, which allows abnormal noise due to pitch cycle mismatch and feeling of mute due to signal power attenuation to be suppressed, subjective deterioration of naturalness and continuity due to voice packet loss to be improved, and the voice packet loss concealment performance in, for example, the rise part of a voice to be further improved.

DISCLOSURE OF INVENTION

Accordingly, a voice packet loss concealment device of the present invention comprises an estimating section for estimating the voice characteristics of a voice packet lost segment using at least one of either a pre-loss voice packet received before the lost segment or a post-loss voice packet received after the lost segment; a pitch signal generating section for generating a pitch signal having the voice characteristics estimated by the estimating section; and a lost packet generating section for outputting the pitch signal generated by the pitch signal generating section, with the voice characteristics estimated by the estimating section being added thereto, as a loss concealment packet.

Thus, with the arrangement described above, the lost packet generating section can generate a concealment signal (element contained in the loss concealment packet) having a smooth pitch fluctuation characteristic and a smooth power fluctuation characteristic, which allows abnormal noise due to pitch cycle mismatch and feeling of mute due to signal power attenuation to be suppressed, and subjective deterioration of both naturalness and continuity due to voice packet loss to be improved.

The estimating section may be arranged to estimate a third pitch fluctuation characteristic of the lost segment and a third power fluctuation characteristic of the lost segment as the voice characteristics, using a first pitch fluctuation characteristic of the post-loss voice packet and a first power fluctuation characteristic of the post-loss voice packet, and a second pitch fluctuation characteristic of the pre-loss voice packet and a second power fluctuation characteristic of the pre-loss voice packet. With this arrangement, it is possible to estimate the voice characteristics accurately even in the case the lost segment has a long duration, or the voice characteristics change drastically in a lost segment corresponding to the start point or end point of the voice.

Further, the voice packet loss concealment device may be arranged to comprise a receive buffer for accumulating received voice packets, wherein the receive buffer is used as an absorption buffer for absorbing packet transmission delay fluctuation. With this arrangement, it is possible to compensate for the voice quality without a new design or a design change.

The voice packet loss concealment device may be arranged to further comprise an output buffer for accumulating one or more voice packets required for voice processing among the voice packets accumulated in the receive buffer, wherein the estimating section estimates the voice characteristics using the post-loss voice packet accumulated in the receive buffer and the pre-loss voice packet accumulated in the output buffer. With this arrangement, a more accurate estimation can be made.

Then, the voice packet loss concealment device may be arranged to comprise an accumulated packet number monitoring section for outputting a selection signal that indicates one of either pre-loss voice packet or post-loss voice packet based on the number of voice packets accumulated in the receive buffer. With this arrangement, it is possible to generate a loss concealment signal using one of either the pre-loss voice packet or the post-loss voice packet even in the case where no voice packet is accumulated in the receive buffer due to, for example, burst transmission delay fluctuation.

In addition, a voice packet loss concealment device of the present invention comprises a receive buffer for accumulating voice packets; a detecting section for detecting the loss of a voice packet and outputting information relating to a lost segment; an output buffer for accumulating one or more voice packets required for voice processing among the voice packets accumulated in the receive buffer; a pitch fluctuation characteristics estimating section for estimating the pitch fluctuation characteristics of the lost segment based on a post-loss voice packet received after the lost segment among the voice packets accumulated in the receive buffer and a pre-loss voice packet received before the lost segment among the one or more voice packets accumulated in the output buffer; a power fluctuation characteristics estimating section for estimating the power fluctuation characteristics of the lost segment based on the post-loss voice packet and the pre-loss voice packet; a pitch signal generating section for generating a pitch signal having the voice characteristics estimated by the estimating sections; and a lost packet generating section for outputting the pitch signal generated by the pitch signal generating section, with the power fluctuation characteristics estimated by the power fluctuation characteristics estimating section being added thereto, as a loss concealment packet.

Thus, the arrangement described above allows abnormal noise due to pitch cycle mismatch or feeling of mute due to signal power attenuation to be suppressed, and subjective deterioration of naturalness and continuity due to voice packet loss to be further improved in comparison with the prior art.

The pitch fluctuation characteristics estimating section may be arranged to comprise a pitch searching part for searching a first pitch cycle using the post-loss voice packet accumulated in the receive buffer and a second pitch cycle using the pre-loss voice packet accumulated in the output buffer; and a pitch fluctuation characteristics calculating part for calculating the pitch fluctuation characteristics of the lost segment based on the first pitch cycle and the second pitch cycle searched by the pitch searching part, and outputting a pitch fluctuation estimated value. With this arrangement, it is possible to search a pitch in the segments before and after the lost segment, which allows an interpolation of great precision, resulting in voice quality improvement.

The power fluctuation characteristics estimating section may be arranged to comprise a signal power calculating part for calculating a first signal power using the post-loss voice packet accumulated in the receive buffer and a second signal power using the pre-loss voice packet accumulated in the output buffer; and a power fluctuation characteristics calculating part for calculating the power fluctuation characteristics of the lost segment based on the first signal power and the second signal power calculated by the signal power calculating part. With this arrangement, a more natural voice can be obtained.

The voice packet loss concealment device may be arranged to comprise a pitch signal generating section for generating a pitch signal having the pitch fluctuation characteristics estimated by the pitch fluctuation characteristics estimating section; a lost packet generating section for outputting the pitch signal generated by the pitch signal generating section, with the power fluctuation characteristics estimated by the power fluctuation characteristics estimating section being added thereto, as the loss concealment packet; and an output packet switching section for selectively outputting the loss concealment packet outputted from the lost packet generating section or a received normal voice packet from the receive buffer based on a determination signal outputted from the detecting section, indicating whether or not there is any voice packet loss. This arrangement allows subjective deterioration of naturalness and continuity due to voice packet loss to be improved.

The pitch signal generating section may be arranged to extract a pitch signal, which is contained in the post-loss voice packet accumulated in the receive buffer or the pre-loss voice packet accumulated in the output buffer, in accordance with a pitch fluctuation estimated value estimated by the pitch fluctuation characteristics estimating section. With this arrangement, it is possible to generate a signal more approximate to the original signal than a loss concealment signal generated from the pre-loss signal, which allows deterioration of naturalness and continuity in voice segments to be further suppressed.

The pitch signal generating section may also be arranged to output a composite pitch signal obtained by adding: a first pitch signal obtained using the post-loss voice packet, with a first weighting coefficient due to the power fluctuation characteristics estimated by the power fluctuation characteristics estimating section being multiplied thereto; and a second pitch signal obtained using the pre-loss voice packet, with a second weighting coefficient due to the power fluctuation characteristics estimated by the power fluctuation characteristics estimating section being multiplied thereto, as the pitch signal. With this arrangement, the composite pitch signal is obtained by switching various weighting coefficients, resulting in voice quality improvement.

The pitch fluctuation characteristics estimating section may be arranged to obtain the pitch fluctuation characteristics using the pre-loss voice packet accumulated in the output buffer in the case there is accumulated no post-loss voice packet in the receive buffer. With this arrangement, the addition is made with an increased weighting of the loss concealment signal generated based on, for example, a pre-loss signal including the rise of a voice.

The power fluctuation characteristics estimating section may be arranged to obtain the power fluctuation characteristics using the pre-loss voice packet accumulated in the output buffer in the case there is accumulated no post-loss voice packet in the receive buffer. With this arrangement, it is possible to generate a loss concealment signal using only a pre-loss voice signal even in the case where no voice packet is accumulated in the receive buffer due to, for example, burst transmission delay fluctuation.

A voice packet loss concealment device of the present invention comprises a receive buffer for accumulating voice packets; a packet loss determining section for detecting the loss of a packet using the voice packets accumulated in the receive buffer; an output-packet buffer for accumulating one or more packets required for voice processing among the voice packets accumulated in the receive buffer; a pitch fluctuation characteristics estimating section for estimating the pitch fluctuation characteristics of the lost voice packet based on a post-loss voice packet received after the lost segment among the voice packets accumulated in the receive buffer and a pre-loss voice packet received before the lost segment among one or more voice packets accumulated in the output buffer; a power fluctuation characteristics estimating section for estimating the power fluctuation characteristics of the lost voice packet based on the post-loss voice packet and the pre-loss voice packet; a pitch signal generating section for generating a pitch signal having the pitch fluctuation characteristics estimated by the pitch fluctuation characteristics estimating sections; a lost packet generating section for outputting the pitch signal generated by the pitch signal generating section, with the power fluctuation characteristics estimated by the power fluctuation characteristics estimating section being added thereto, as the loss concealment packet; and an output packet switching section for selectively outputting the loss concealment packet outputted from the lost packet generating section or a received normal voice packet from the receive buffer based on a detection signal from the detecting section.

Thus, the arrangement described above allows abnormal noise due to pitch cycle mismatch or feeling of mute due to signal power attenuation to be suppressed, and subjective deterioration of naturalness and continuity due to voice packet loss to be improved.

The pitch signal generating section may be arranged to generate the pitch signal by applying a weighting addition to each of the pitch fluctuation characteristics and the power fluctuation characteristics of the post-loss voice packet in the case the lost segment corresponds to the first transition segment from one including no voice to another including the rise of the voice. Thus, with the arrangement described above, the loss concealment packet is obtained by switching various weighting coefficients, resulting in voice quality improvement.

In addition, a receiving terminal of the present invention, in which voice packets containing voice data are received, comprises a receive buffer for accumulating received voice packets; a detecting section for detecting the loss of a voice packet accumulated in the receive buffer and outputting information relating to a lost segment; an estimating section for estimating the voice characteristics of the lost segment using at least one of either a pre-loss voice packet received before the lost segment that is detected by the detecting section or a post-loss voice packet received after the lost segment; a pitch signal generating section for generating a pitch signal having the voice characteristics estimated by the estimating section; and a lost packet generating section for outputting the pitch signal generated by the pitch signal generating section, with the voice characteristics estimated by the estimating section being added thereto, as a loss concealment packet.

With this arrangement, users can make a call with high voice quality by purchasing a receiving terminal.

Also, a voice packet loss concealment method of the present invention in a receiving terminal, in which voice packets containing voice data are received, is characterized in that a detecting section of the receiving terminal detects the loss of the voice packet and outputs a detection signal containing information relating to at least a lost segment; an estimating section of the receiving terminal estimates the voice characteristics of the lost segment using voice packets received before and after the detected lost segment; a pitch signal generating section of the receiving terminal generates a pitch signal having the estimated voice characteristics; and a lost packet generating section of the receiving terminal outputs the generated pitch signal, with the estimated voice characteristics being added thereto, as a loss concealment packet.

Thus, the arrangement described above allows abnormal noise due to pitch cycle mismatch or feeling of mute due to signal power attenuation to be suppressed, and subjective deterioration of naturalness and continuity due to voice packet loss to be improved.

The voice packet loss concealment method may be arranged in such a manner that the estimating section of the receiving terminal estimates the pitch fluctuation characteristics and the power fluctuation characteristics of the lost segment using voice packets before and after the lost segment among the voice packets accumulated in a receive buffer that is provided to absorb transmission delay fluctuation in a transmission channel; the pitch signal generating section of the receiving terminal generates a pitch signal having the estimated voice characteristics; and the lost packet generating section of the receiving terminal outputs the generated pitch signal, with the estimated voice characteristics being added thereto, as a loss concealment packet. This arrangement allows abnormal noise due to pitch cycle mismatch or feeling of mute due to signal power attenuation to be suppressed, and subjective deterioration of naturalness and continuity due to voice packet loss to be improved.

Further, a voice communication system of the present invention, in which voice data is packetized and transmitted, is characterized in that a receiving terminal for receiving voice packets containing the voice data comprises a detecting section for detecting the loss of a voice packet and outputting information relating to a lost segment; an estimating section for estimating the voice characteristics of the lost segment using at least one of either a pre-loss voice packet received before the lost segment that is detected by the detecting section or a post-loss voice packet received after the lost segment; a pitch signal generating section for generating a pitch signal having the voice characteristics estimated by the estimating section; and a lost packet generating section for outputting the pitch signal generated by the pitch signal generating section, with the voice characteristics estimated by the estimating section being added thereto, as a loss concealment packet.

Thus, with the arrangement described above, the waveforms of the loss concealment packet and the voice packet received normally after the packet loss are connected smoothly, which allows both abnormal noise due to pitch cycle mismatch and feeling of mute due to signal power attenuation to be suppressed, and subjective deterioration of auditory naturalness and continuity caused by voice packet loss to be improved.

Figure 13A:
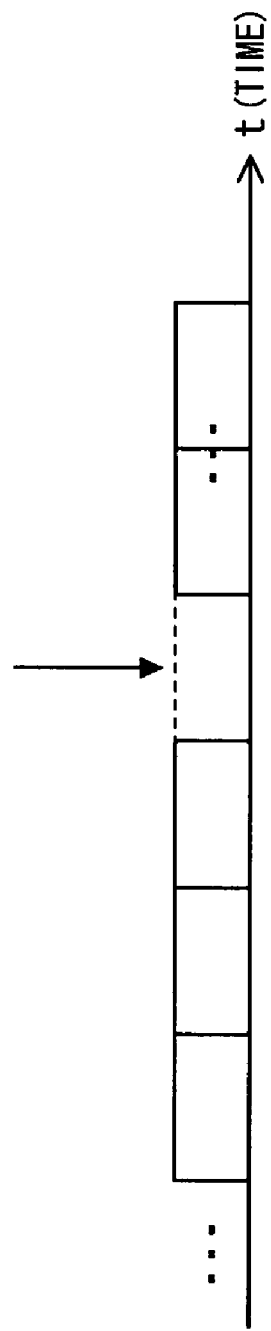
Figure 13B:
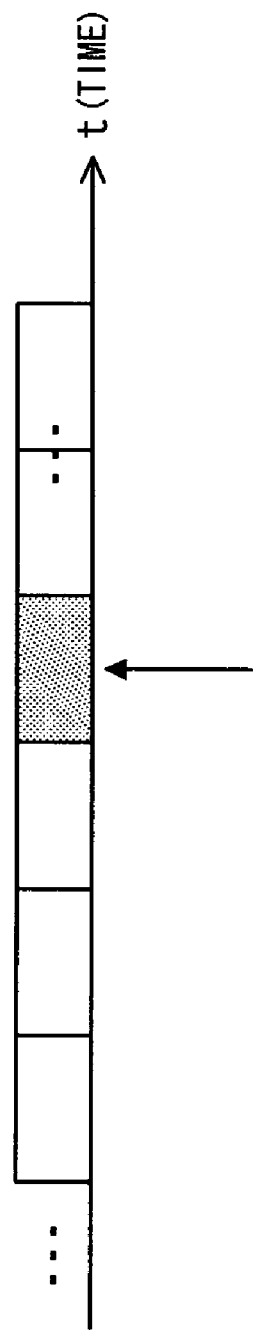

Both FIGS. 13(*a*) and 13(*b*) are illustrative views of a voice packet loss concealment method.

Figure 14:
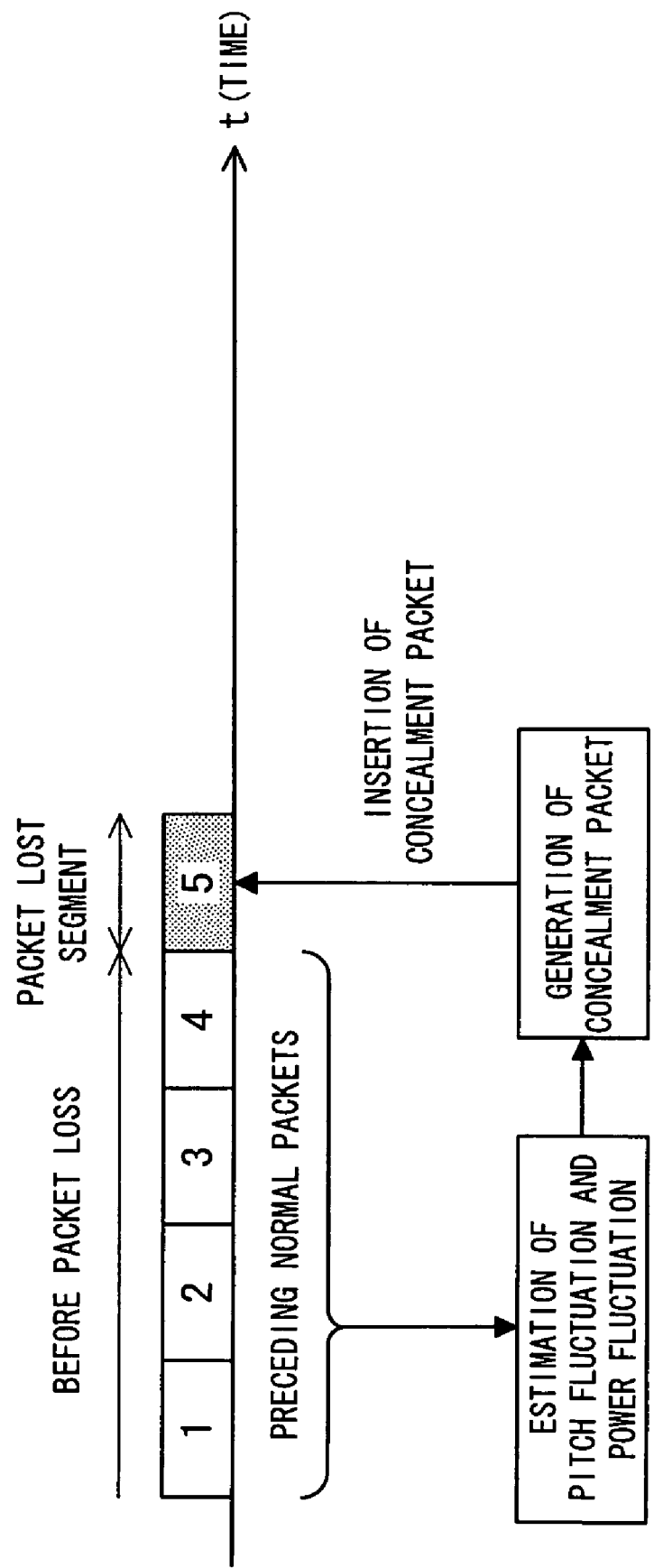

FIG. 14 is an illustrative view of a voice packet estimation method using preceding voice packets.

BEST MODE FOR CARRYING OUT THE INVENTION

Description of a First Embodiment of the Present Invention

Figure 1:
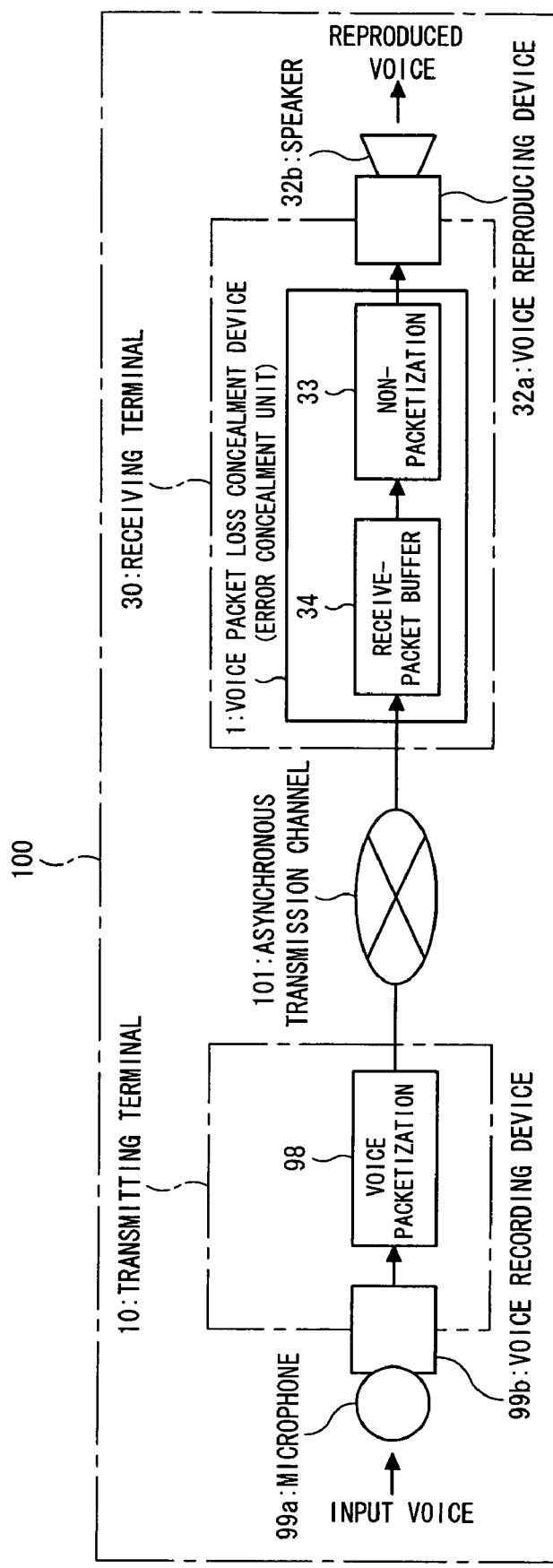
FIG. 1 is a block diagram of a VoIP communication system to which the present invention is applied.

FIG. 1 is a block diagram of a VoIP communication system to which the present invention is applied. The VoIP communication system 100 shown in FIG. 1 is a voice packet communication system in which voice data (encoded voice data) is packetized and transmitted, comprising an asynchronous transmission channel 101, a transmitting terminal 10, and a receiving terminal 30. A voice packet loss concealment device of the present invention is applied to a voice reproduction processing section of the receiving terminal 30 to be described hereinafter.

(1) Configuration of the VoIP Communication System 100

(1-1) Asynchronous Transmission Channel 101

The asynchronous transmission channel 101 is an IP network (e.g. Internet) in which voice packets are transferred.

The asynchronous transmission channel 101 is a best effort type network including transmission delay fluctuation. Although the asynchronous transmission channel 101 accepts a certain degree of IP packet loss due to congestion, etc., the burst loss of voice packets makes it impossible for the receiving terminal 30 to receive and reproduce consecutive voice packets. Therefore, the following description will be given on the assumption that there occurs no consecutive voice packet loss.

(1-2) Transmitting Terminal 10

The transmitting terminal 10, which converts an input voice into voice data and transmits voice packets containing the voice data at a regular time interval (hereinafter referred to as "segment"), is a cellular phone or land line for example. The transmitting terminal 10 comprises a microphone 99*a* for converting an input voice into an electric signal and outputting it, a voice recording device (voice logging device) 99*b* for recording (logging) the electric signal from the microphone 99*a* at the point, and a voice packet generating section 98 for encoding the recorded data recorded by the voice recording device 99*b* and generating voice packets containing the encoded voice data.

(1-3) Voice Packetization (Packetization)

The transmitting terminal 10 samples (sampling) a voice N times for one segment, and generates N sets (N samples) of PCM data (forming one frame). Then, the transmitting terminal 10 packetizes the N sets of PCM data into one voice packet and transmits it.

In the first embodiment, for each of a plurality of voice packets transmitted from the transmitting terminal 10, data (N samples of PCM data) for one packet is extracted at a reception processing unit (non-packetization unit 33 to be described hereinafter) provided in the receiving terminal 30, and the extracted data of each packet is used for voice generation.

(1-4) Receiving Terminal 30

The receiving terminal 30, which receives voice packets containing voice data, is a cellular phone or land line for example. The receiving terminal 30 comprises a voice reproducing device 32*a*, a speaker 32*b*, and a voice packet loss concealment device (error concealment unit) 1. Here, the voice reproducing device 32*a* reproduces voice data from the voice packet loss concealment device 1, and then the speaker 32*b* outputs the output voice data from the voice reproducing device 32*a*.

Also, the voice packet loss concealment device 1 estimates both the pitch fluctuation characteristics (i.e., temporal fluctuation characteristics of the pitch cycle of vocal cords) and the voice power fluctuation characteristics of a lost voice packet in a segment from which the voice packet is lost (voice packet lost segment), and generates a loss concealment packet for concealing (replacing or alternating) the lost voice packet, comprising a receive-packet buffer (receive buffer) 34 and a voice non-packetization unit 33.

It is noted here that the receive-packet buffer 34 accumulates received voice packets, for at least two frames (2N samples) after a lost segment. The voice packet loss concealment device 1 uses the receive-packet buffer 34 as an absorption buffer for absorbing packet transmission delay fluctuation, resulting in voice quality improvement.

The voice non-packetization unit 33 extracts voice data from voice packets sequentially outputted from the receive-packet buffer 34 or protocol-converted voice packets.

Thus, voice packets transmitted from the transmitting terminal 10 for each voice packet segment are received sequentially at the receiving terminal 30 via the asynchronous transmission channel 101, and the received voice packets are accumulated into the receive-packet buffer 34. Then in the voice non-packetization unit 33, a voice signal is outputted from voice data obtained from the packets, and the reproduced voice is outputted from the speaker 32*b*. Also in the voice non-packetization unit 33, reading a plurality of voice packets accumulated in the receive-packet buffer 34 compensates for both the pitch fluctuation and the power fluctuation.

(1-5) Packets Required for Loss Concealment

Figure 2:
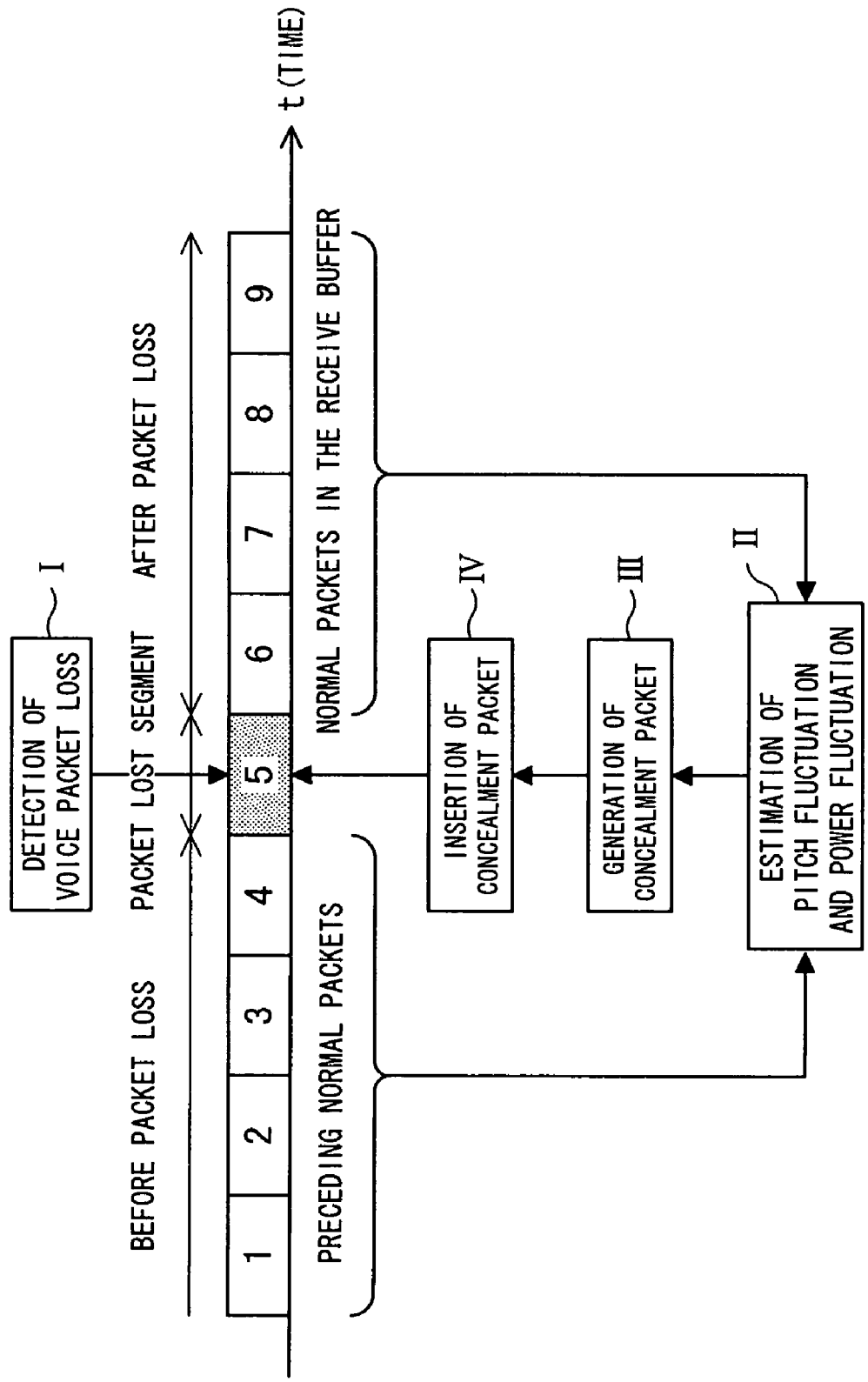
FIG. 2 is an illustrative view of a voice packet loss concealment method according to a first embodiment of the present invention.

FIG. 2 is an illustrative view of a voice packet loss concealment method according to the first embodiment of the present invention. The packet segment (segment) 1 shown in FIG. 2 is a head segment where a voice packet is received first, while the segment 9 is a segment where a voice packet is received last, assuming that the voice packet in the segment 5 among the segments 1 to 9 is lost. Further, the segments 1 to 4 indicate segments before the segment 5 where each voice packet is received normally, while the segments 6 to 9 indicate segments after the segment 5 where each voice packet is also received normally. Voice packets received in the segments 6 to 9 are accumulated in the receive-packet buffer 34.

It is noted here that the estimation of the pitch fluctuation characteristics and the power fluctuation characteristics using a signal for two packets in the receiving terminal 30 means using two post-loss packets and two pre-loss packets. To be concrete, the pitch fluctuation characteristics and the power fluctuation characteristics are estimated using PCM signals, respectively, for 2N samples after the lost segment and 2N samples before the lost segment.

The number of packets is not restricted to two, allowing the use of a desired number of packets. The signal length required for estimation by the receiving terminal 30 is at least a length capable of extracting the pitch cycle. To reproduce the pitch cycle of a human voice, in the case of PCM at 8 kHz sampling rate, 20 to 140 samples are needed.

To be concrete, the sample length required for a correlation calculation (refer to Formula (F12) to be described hereinafter), in which a pitch fluctuation calculating part 36b of the receiving terminal 30 calculates the pitch cycle fluctuation, is needed.

Thus, the voice packet loss concealment device 1 uses voice packets before and after a voice packet lost segment to estimate the pitch cycle fluctuation and the power fluctuation of the lost segment, which allows a more accurate estimation in comparison with a device that estimates a lost voice packet using only a pre-loss voice packet.

(1-6) Voice Packet Loss Concealment Device 1

In addition, the voice packet loss concealment device 1 is provided with a receive buffer capable of constantly retaining latest two previous and next frames (2N samples) of data among received data, and an output buffer.

Next, the voice packet loss concealment device 1 and the voice packet loss concealment method will be described with reference to FIGS. 3 and 4.

Figure 3:
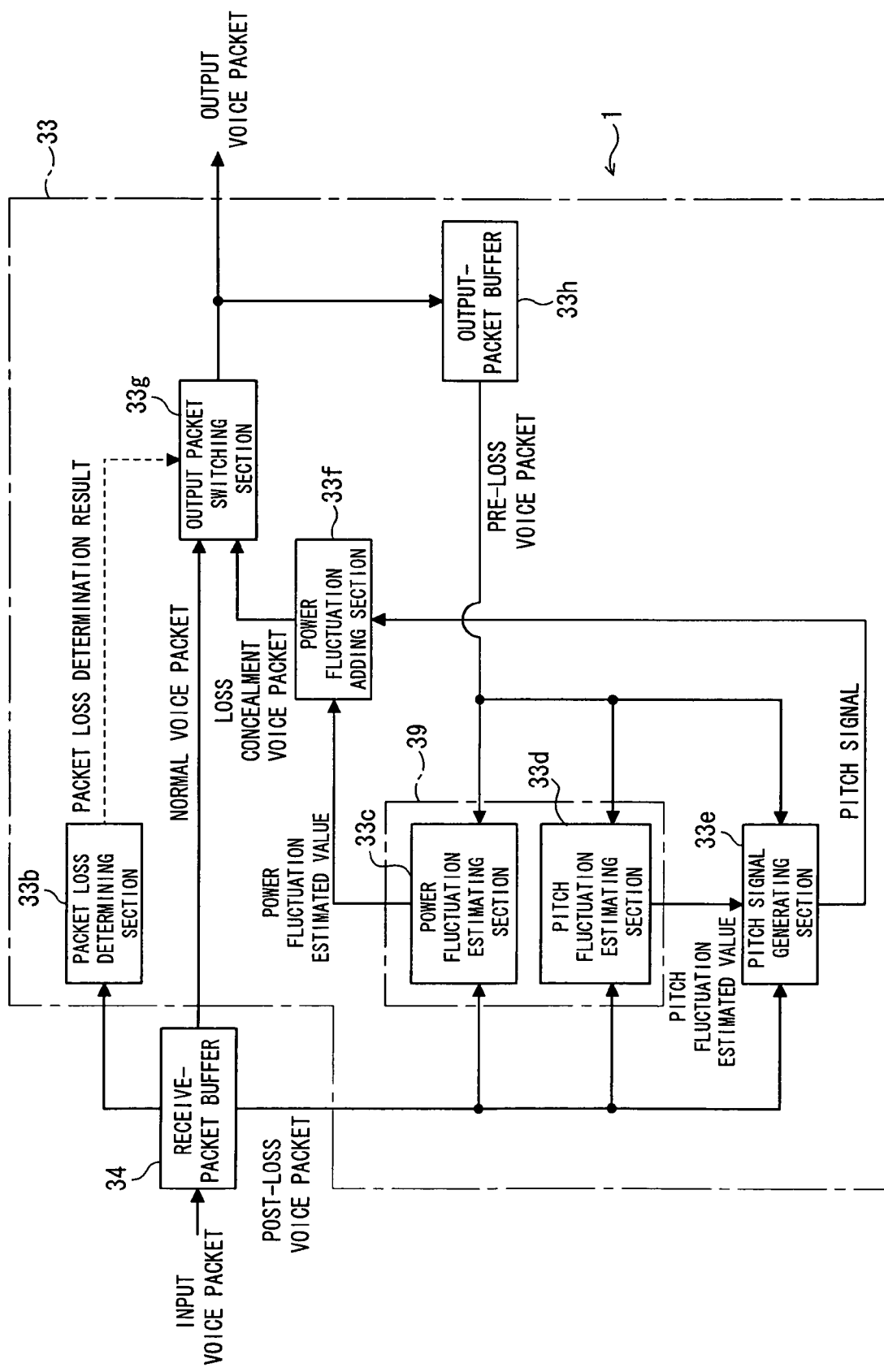
FIG. 3 is a principle block diagram of the present invention.

FIG. 3 is a principle block diagram of the present invention. The voice packet loss concealment device 1 shown in FIG. 3 comprises a packet loss determining section (detecting section) 33b, a voice characteristics estimating section (estimating section) 39, a pitch signal generating section 33e, a power fluctuation adding section (lost packet generating section) 33f, an output packet switching section 33g, and an output-packet buffer 33h. It is noted that the receive-packet buffer 34 is the same as mentioned above.

It is noted here that the packet loss determining section 33b, which detects the loss of a voice packet and outputs information relating to a lost segment, operates as a detecting section. The packet loss determining section 33b detects a lost segment based on the packet number (consecutively assigned packet sequence number) contained in a voice packet. The packet loss determining section 33b outputs whether or not there is any voice packet loss as a packet loss determination result, for example, by monitoring packet numbers of voice packets accumulated in the receive-packet buffer 34.

The output packet switching section 33g outputs selectively a loss concealment packet outputted from the power fluctuation adding section 33f or a received voice packet based on a determination signal outputted from the packet loss determining section 33b, indicating whether or not there is any voice packet loss.

The output-packet buffer 33h accumulates voice packets for at least 2N (N represents a natural number) samples before a lost segment, which is required for voice processing, among the voice packets accumulated in the receive-packet buffer 34. These voice packets for 2N samples include PCM data for two segments, i.e., 2N sets of PCM data sampled from two consecutive voice data before the lost segment. Therefore, the receiving terminal 30 constantly retains latest two previous and next frames (2N samples) of data.

The voice characteristics estimating section 39 estimates the voice characteristics of a voice packet lost segment (lost voice packet) using a pre-loss voice packet received before the lost segment and a post-loss voice packet received after the lost segment.

It is noted here that the voice characteristics estimating section 39 uses a lost segment that is detected by the packet loss determining section 33b as the lost segment. On the contrary, the voice characteristics estimating section 39 can also use a lost segment that has already been incorporated independently or preliminarily.

The voice characteristics estimating section 39 comprises a pitch fluctuation estimating section (pitch fluctuation characteristics estimating section) 33d and a power fluctuation estimating section (power fluctuation characteristics estimating section) 33c.

The pitch fluctuation estimating section 33d estimates the pitch fluctuation characteristics of a lost segment based on a post-loss voice packet received after the lost segment among the voice packets accumulated in the receive-packet buffer 34 and a pre-loss voice packet received before the lost segment among 2N sets of voice packets accumulated in the output-packet buffer 33h. The pitch fluctuation estimating section 33d will hereinafter be described in detail with reference to FIG. 7.

Also, the power fluctuation estimating section 33c estimates the power fluctuation characteristics of the lost segment based on the post-loss voice packet and the pre-loss voice packet. The power fluctuation estimating section 33c will hereinafter be described in detail with reference to FIG. 6.

Accordingly, the voice characteristics estimating section 39 has a function of estimating the pitch fluctuation characteristics and the power fluctuation characteristics of the lost segment as the voice characteristics, using the pitch fluctuation characteristics of the post-loss voice packet, the power fluctuation characteristics of the pre-loss voice packet, the pitch fluctuation characteristics of the pre-loss voice packet, and the power fluctuation characteristics of the post-loss voice packet.

It is noted here that the pitch fluctuation estimating section 33d, the power fluctuation estimating section 33c, and the pitch signal generating section 33e all use voice packets that have arrived at the receive-packet buffer 34, which is provided to absorb transmission delay fluctuation. Therefore, it is possible to compensate for the voice quality without a new design or a design change.

Further, in the receiving terminal 30 of the VoIP communication system 100 is provided with the receive-packet buffer 34 to absorb packet transmission delay fluctuation, and a required number of voice packets for compensation of transmission delay fluctuation are accumulated sequentially into the receive-packet buffer 34. That is, post-loss voice packets have already been accumulated in the receive-packet buffer 34 at the time the concealment processing for a lost packet is performed.

Thus, with the output-packet buffer 33h for accumulating 2N sets of voice packets required for voice processing among voice packets accumulated in the receive-packet buffer 34 being further comprised, the voice characteristics estimating section 39 estimates the voice characteristics using a post-loss voice packet accumulated in the receive-packet buffer 34 and a pre-loss voice packet accumulated in the output-packet buffer 33h.

The pitch signal generating section 33e generates a pitch signal having the pitch fluctuation characteristics estimated by the pitch fluctuation estimating section 33d. To be concrete, the pitch signal generating section 33e segments (extracts) a pitch signal, which is contained in the post-loss voice packet accumulated in the receive-packet buffer 34 or the pre-loss voice packet accumulated in the output-packet buffer 33h, in accordance with a pitch fluctuation estimated value estimated by the pitch fluctuation estimating section 33d. The pitch signal generating section 33e obtains the pitch signal using the post-loss voice packet accumulated in the receive-packet buffer 34 and the pre-loss voice packet accumulated in the output-packet buffer 33h. Further, the pitch signal generating section 33e can generate a concealment signal (element contained in the loss concealment packet) having a smooth pitch fluctuation characteristic. The concrete method for this will hereinafter be described.

In addition, the power fluctuation adding section 33f, which outputs the pitch signal generated by the pitch signal generating section 33e, with the power fluctuation characteristics estimated by the power fluctuation estimating section 33c being added thereto, as a loss concealment packet, operates as a lost packet generating section.

It is noted that the power fluctuation adding section 33f outputs the concealment signal from the pitch signal generating section 33e, inserting it into the loss concealment packet.

Further, the output packet switching section 33g outputs selectively the loss concealment packet outputted from the power fluctuation adding section 33f or a received normal voice packet from the receive-packet buffer 34 based on the determination signal outputted from the packet loss determining section 33b.

(2) Voice Packet Loss Concealment Method of the Present Invention

It is noted here that when comparing a conventional voice packet loss concealment method and the voice packet loss concealment method of the present invention, the conventional method uses only the information contained in preceding received voice packets to avoid an increase in transmission delay.

In contrast thereto, the voice packet loss concealment method of the present invention provides the receive-packet buffer 34 to absorb transmission delay fluctuation in the receiving terminal 30. Since the receiving terminal 30 originally accepts delay for compensating for transmission fluctuation in the receive-packet buffer 34, the voice packet loss concealment device 1 can utilize voice packets in the receive-packet buffer 34 effectively whereby no other delay or increase in the amount of delay occurs in the voice packet loss concealment device 1.

Figure 4:
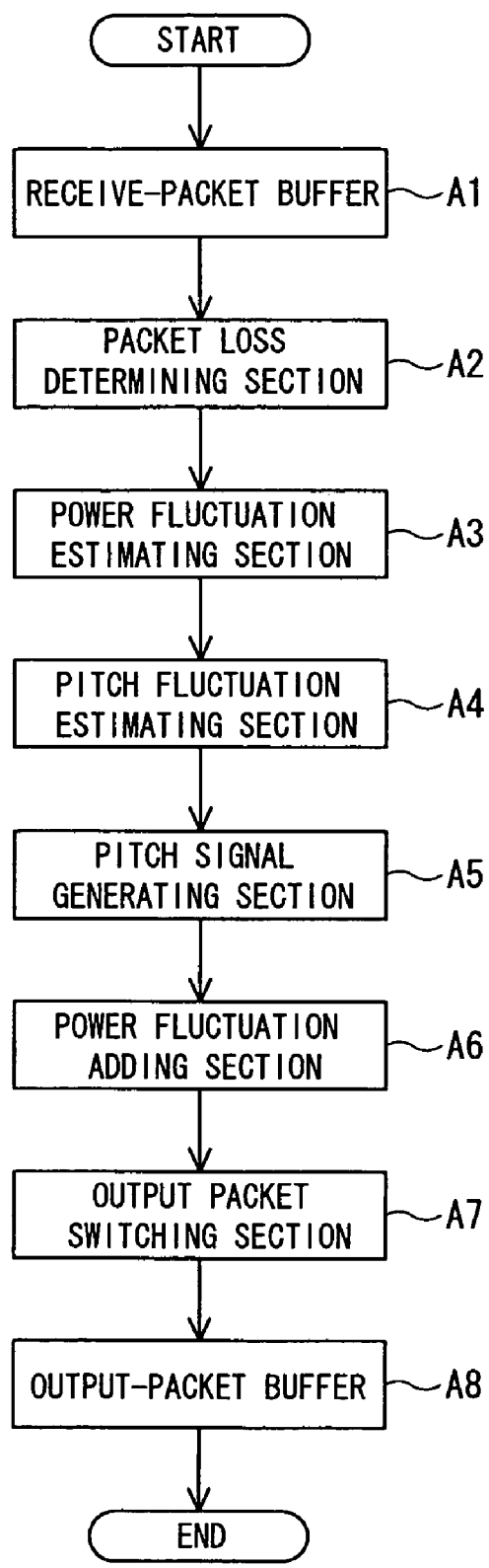
FIG. 4 is an illustrative flow chart of the voice packet loss concealment method according to the first embodiment of the present invention.

FIG. 4 is an illustrative flow chart of the voice packet loss concealment method according to the first embodiment of the present invention.

In step A1, voice packets that arrive at the receiving terminal 30 at an irregular interval are inputted to the receive-packet buffer 34 to be accumulated as preprocessed voice packets. The receive-packet buffer 34 accumulates the arriving voice packets sequentially, and then outputs the accumulated voice packets in the accumulated order to the output packet switching section 33g at a regular interval that is synchronized with the reproduction interval of the voice reproducing device 32a (refer to FIG. 1).

Then, the output-packet buffer 33h accumulates sequentially the voice packets outputted from the output packet switching section 33g. When the accumulated number of voice packets has reached the buffer size, the output-packet buffer 33h discards the oldest voice packet to accumulate the latest output voice packet.

In step A2, the packet loss determining section 33b detects whether or not there is any voice packet loss (refer to Formula (F6) to be described hereinafter) by checking the packet number (sequence number) of a voice packet to be output next, which is accumulated in the receive-packet buffer 34, and then outputs a voice packet loss determination result to the output packet switching section 33g. To be concrete, when detecting a voice packet loss, the packet loss determining section 33b inputs a voice packet before the lost voice packet (i.e., pre-loss voice packet) accumulated in the output-packet buffer 33h and a voice packet after the lost voice packet accumulated in the receive-packet buffer 34 to the power fluctuation estimating section 33c, the pitch fluctuation estimating section 33d, and the pitch signal generating section 33e.

In step A3, the power fluctuation estimating section 33c estimates the power fluctuation characteristics of the lost voice packet segment using the voice packets for two packets (2N samples) before and after the loss, and then outputs a power fluctuation estimated value to the power fluctuation adding section 33f.

In step A4, the pitch fluctuation estimating section 33d estimates the pitch fluctuation characteristics of the lost voice packet segment using pre-loss and post-loss voice packets, and then outputs a pitch fluctuation estimated value to the pitch signal generating section 33e.

In step A5, the pitch signal generating section 33e generates a pitch signal having the estimated pitch fluctuation characteristics using the pitch fluctuation estimated value estimated by the pitch fluctuation estimating section 33d and the pre-loss voice packets accumulated in the output-packet buffer 33h. It is noted that the generated pitch signal is inputted to the power fluctuation adding section 33f.

In step A6, the power fluctuation adding section 33f adds the power fluctuation estimated value estimated by the power fluctuation estimating section 33c to the pitch signal from the pitch signal generating section 33e, and then outputs the added pitch signal to the output packet switching section 33g as a loss concealment packet (loss concealment packet).

In step A7, the output packet switching section 33g outputs one of two types of voice packets by switching selectively to the voice reproducing device 32a (refer to FIG. 1) depending on the voice packet loss determination result from the packet loss determining section 33b. That is, when the voice packet loss determination result indicates "voice packet lost", the output packet switching section 33g outputs the loss concealment packet from the power fluctuation adding section 33f, otherwise outputs a normal voice packet outputted from the receive-packet buffer 34 at a regular interval.

Next in step A8, the output-packet buffer 33h is arranged in such a manner as to store sequentially voice packets outputted from the output packet switching section 33g, and then input the stored voice packets as pre-loss voice packets to each of the power fluctuation estimating section 33c, the pitch fluctuation estimating section 33d, and the pitch signal generating section 33e as shown in FIG. 3.

Therefore, the voice packet loss concealment device 1 utilizes accumulated voice packets that have arrived at the receive-packet buffer 34, which is provided to absorb voice packet transmission delay fluctuation.

Thus, the voice packet loss concealment device 1 also allows a more accurate estimation in comparison with the prior art that estimates a lost voice packet using only a pre-loss voice packet, in that two voice packets (2N samples) before and after a voice packet lost segment are used to estimate the pitch fluctuation and the power fluctuation of the lost segment.

Also, the voice packet loss concealment method of the present invention is employed in the receiving terminal 30 that receives voice packets containing voice data, and further the receiving terminal 30 is used in the VoIP communication system 100 in which voice data is packetized and transmitted.

The packet loss determining section 33b of the receiving terminal 30 detects the loss of a voice packet (refer to I shown in FIG. 2) and outputs a detection signal containing information relating to the lost segment 5.

The voice characteristics estimating section 39 of the receiving terminal 30 estimates the voice characteristics of the lost segment using the voice packets received, respectively, in the segments 3 and 4 before the detected lost segment 5, and estimates the voice characteristics of the lost segment using the voice packets received, respectively, in the segments 6 and 7 after the lost segment 5. In these estimations, the voice characteristics estimating section 39 estimates the pitch fluctuation characteristics and the power fluctuation characteristics of the lost segment 5 using the voice packets received, respectively, in the segments 3, 4, 6 and 7 before and after the lost segment 5 among voice packets accumulated in the receive-packet buffer 34, which is provided to absorb transmission delay fluctuation in a transmission channel (refer to II shown in FIG. 2).

Then, the power fluctuation adding section (lost packet generating section) 33f of the receiving terminal 30 generates a loss concealment voice packet for the lost segment based on the estimated voice characteristics (pitch fluctuation characteristics and power fluctuation characteristics) (refer to III shown in FIG. 2).

To be concrete, the pitch fluctuation and the power fluctuation of the lost voice packet are estimated using the normal voice packets 1 to 4 before voice packet loss and the normal voice packets 6 to 9 after voice packet loss accumulated in the receive-packet buffer 34.

Then, the non-packetization unit 33 (shown in FIG. 1) generates a loss concealment packet for the voice packet lost segment based on the estimated physical characteristics. Here, the loss concealment packet is generated by adding the pitch fluctuation characteristics and the power fluctuation characteristics. The generated loss concealment packet is also inserted into the segment of the lost voice packet 5 (refer to IV shown in FIG. 2).

Therefore, at the start of the lost voice packet concealment processing, since there exists a post-loss voice packet in the receive-packet buffer 34, the post-loss voice packet can be read out and utilized.

(3) Details for the Voice Packet Loss Concealment Device 1

Next, the processing in each section of the voice packet loss concealment device 1 will hereinafter be described in detail with reference to FIG. 5.

Figure 5:
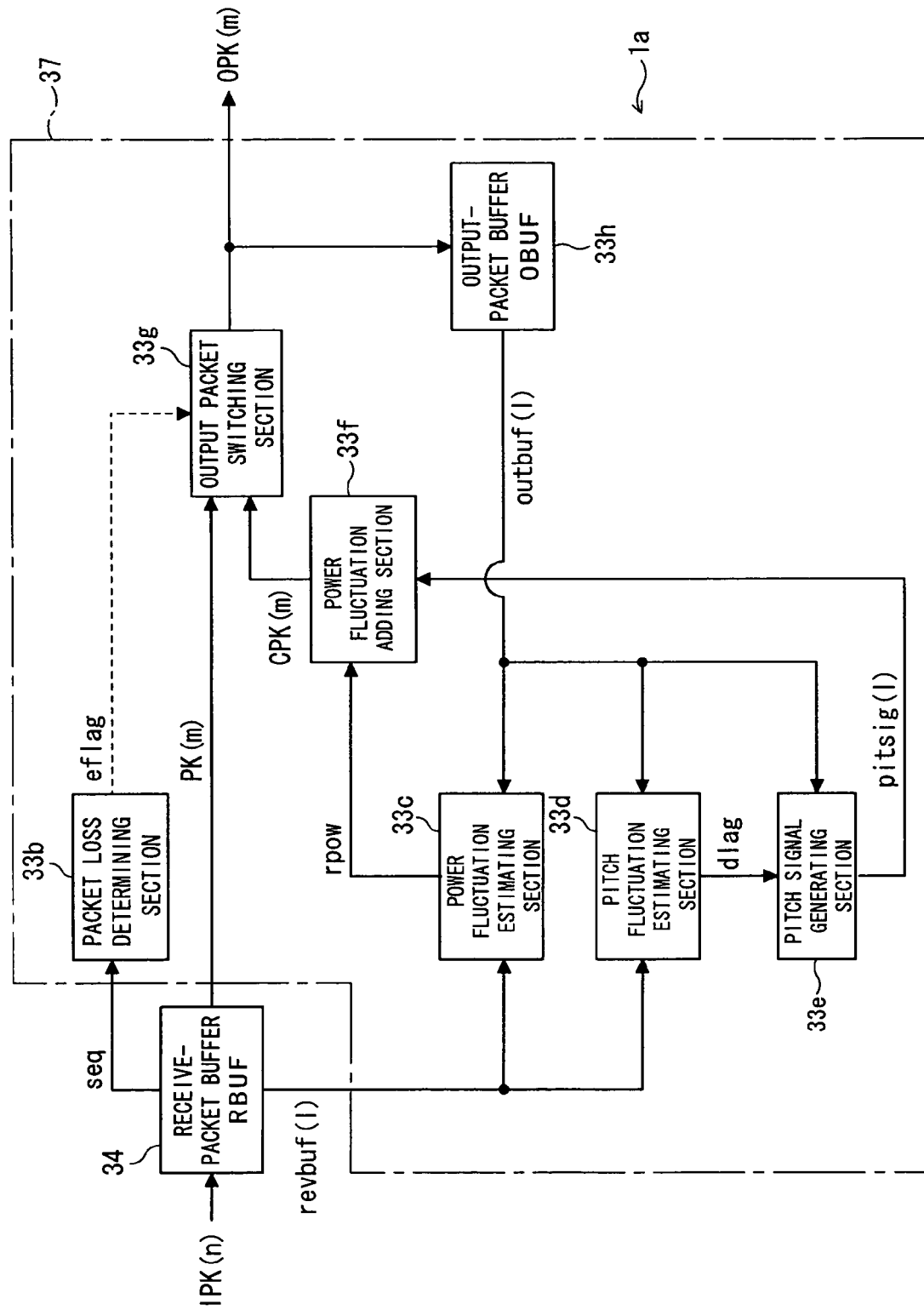
FIG. 5 is a block diagram of a voice packet loss concealment device according to the first embodiment of the present invention.

FIG. 5 is a block diagram of the voice packet loss concealment device 1 according to the first embodiment of the present invention. The voice packet loss concealment device 1 shown in FIG. 5 is provided in the receiving terminal 30 of the VoIP communication system 100, in which voice packets obtained by packetizing voice data for each N-sample (N represents a natural number) are transmitted via the asynchronous transmission channel (IP network) 101. Also, elements in FIG. 5 having the same numerals as above are the same as mentioned above.

(3-1) Receive-Packet Buffer 34

A voice packet IPK (n) that has arrived at the receiving terminal 30 (refer to FIG. 2) is accumulated into the receive-packet buffer 34. Here, "n," represents the packet number (sequence number) of the voice packet. Although the voice packet IPK (n) has a header section (voice packet header section) containing information required for transmission (not shown in the figure), the header section will not be taken into consideration to facilitate the following description. Therefore, the following description will be given on the assumption that one voice packet IPK (n) consists only of N samples of voice data as indicated by Formula (F1).

$$IPK(n)=\{pk(n,0), pk(n,1), \ldots, pk(n, N-1)\} \quad (F1)$$

where voice packets inputted to the receive-packet buffer 34 include transmission delay fluctuation in the asynchronous transmission channel 101 and arrive at an irregular interval. The voice packets are stored sequentially into the receive-packet buffer 34 as indicated by Formula (F2).

$$RBUF(nrpk)=IPK(n)$$

$$nrpk=nrpk+1; \quad (F2)$$

where RBUF indicates the receive-packet buffer 34. "nrpk" represents the number of voice packets stored in the receive-packet buffer 34, the value of which can be each value from 0 to the buffer size RBUFSIZE of the receive-packet buffer 34.

It is noted that the buffer size RBUFSIZE, which can be set to a desired value, is set appropriately in accordance with the fluctuation state in the asynchronous transmission channel 101.

Then, at the time the value of "nrpk" reaches a set value "s_nrpk" that has been predefined from the start of reception of voice packets, the oldest voice packet RBUF (0) in terms of time is to be outputted to the output packet switching section 33g as PK (m) and updates the receive-packet buffer 34 for each output, as indicated by Formula (F3). Here, "m" represents a natural number.

$$PK(m)=RBUF(0)$$

$$nrpk=nrpk-1;$$

$$RBUF(k)=RBUF(k+1), k=0, \ldots, nrpk \quad (F3)$$

where the output time interval of voice packets is a regular interval that is synchronized with reproduction processing. "s_nrpk" is set, for example, as s_nrpk=RBUFSIZE/2, but also can be set to another desired value other than that.

In addition, the receive-packet buffer 34 sets a variable "revbuf" to 2N samples of voice data (PCM data) accumulated therein, as indicated by Formula (F4), and then outputs them to the power fluctuation estimating section 33c and the pitch fluctuation estimating section 33d.

$$revbuf(k) = \begin{cases} rbuf(0, k) & k = 0, \ldots, N-1 \\ rbuf(1, k-N) & k = N, \ldots, 2N-1 \end{cases} \quad (F4)$$

where "rbuf" is element data of voice packets stored in RBUF, which can be represented by Formula (F5).

$$RBUF(m)=\{rbuf(m,0), rbuf(m,1), \ldots, rbuf(m, N-1)\} \quad (F5)$$

Next, the receive-packet buffer 34 outputs the sequence number "seq" of a preceding (to be outputted next) voice packet RBUF (0) in terms of time among voice packets stored in RBUF to the packet loss determining section 33b.

(3-2) Packet Loss Determining Section 33b

The packet loss determining section 33b detects whether or not there is any voice packet loss by comparing the input "seq" and "old_seq" which is inputted one voice packet segment (immediately) before "seq".

if (seq!=old_seq+1)eflag=1 else eflag=0 (F6)

where if sequence numbers are not consecutive, the packet loss determining section 33b sets "eflag" to 1 to indicate a voice packet loss, outputs it to the output packet switching section 33g, and then increments "old_seq" by 1 (old_seq+=1). Meanwhile, if sequence numbers are consecutive, the packet loss determining section 33b sets "eflag" to 0 and updates "old_seq" with "seq" (old_seq=seq).

(3-3) Output-Packet Buffer 33h

The output-packet buffer 33h updates voice packets stored therein as indicated by Formula (F7), and then stores sequentially voice packets OPK outputted from the output packet switching section 33g.

$$OBUF(0)=OBUF(1)$$

$$OBUF(1)=OPK(m) \quad (F7)$$

That is, in OBUF are constantly stored latest two voice packets in terms of time among the output voice packets. Also, the output-packet buffer 33h stores voice data (PCM data) for 2N samples into "outbuf" as indicated by Formula (F8), and outputs them to the power fluctuation estimating section 33c, the pitch fluctuation estimating section 33d, and the pitch signal generating section 33e.

$$outbuf(k) = \begin{cases} obuf(0, k) & k = 0, \ldots, N-1 \\ obuf(1, k-N) & k = N, \ldots, 2N-1 \end{cases} \quad (F8)$$

where "obuf" is element data of voice packets stored in OBUF, which can be represented by Formula (F9).

$$OBUF(m)=\{obuf(m,0), obuf(m,1), \ldots, obuf(m, N-1)\} \quad (F9)$$

(3-4) Power Fluctuation Estimating Section 33c

Figure 6:
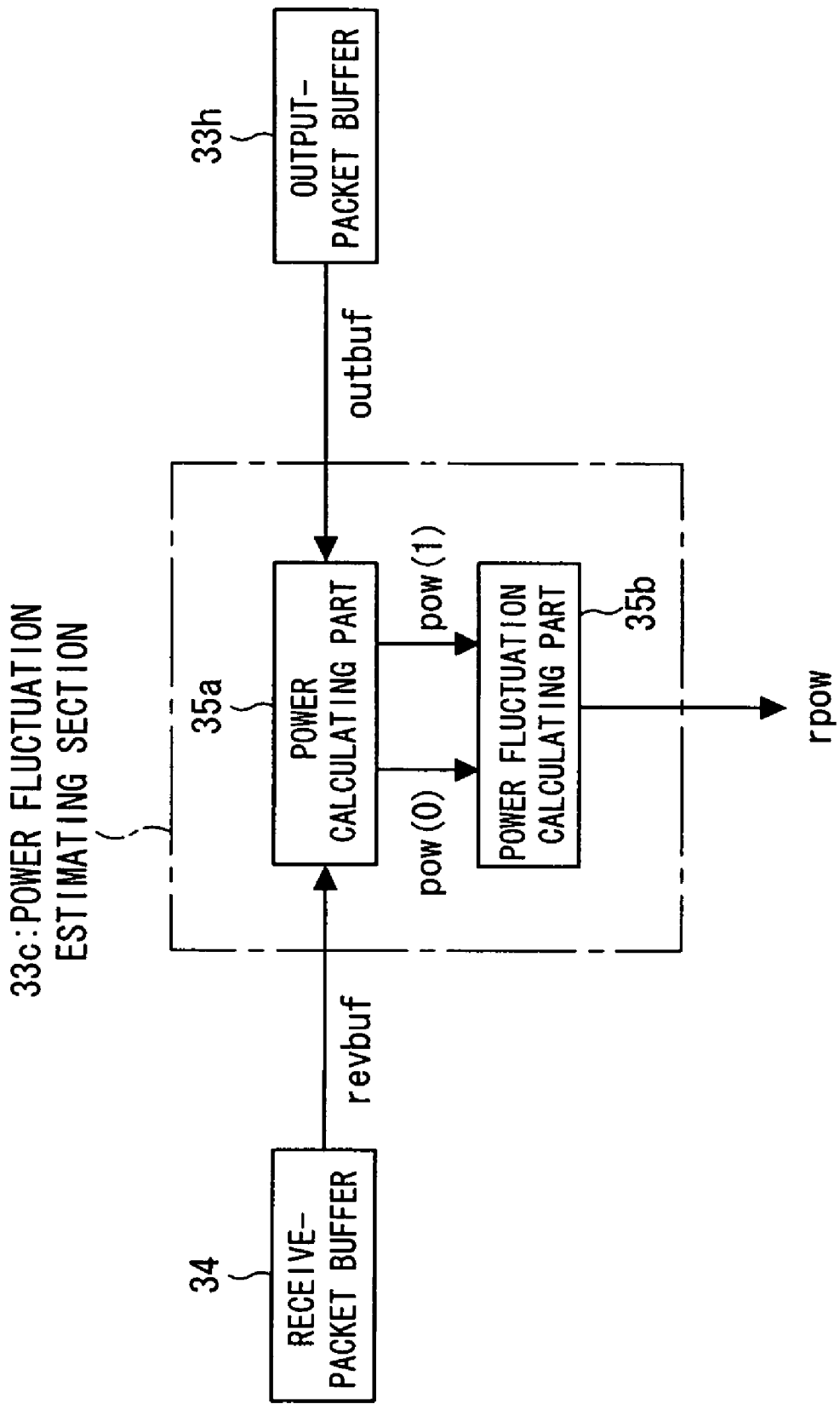
FIG. 6 is a block diagram of a power fluctuation estimating section according to the first embodiment of the present invention.

FIG. 6 is a block diagram of the power fluctuation estimating section 33c according to the first embodiment of the present invention. The power fluctuation estimating section 33c shown in FIG. 6 comprises a power calculating part (signal power calculating part) 35a and a power fluctuation calculating part (power fluctuation characteristics calculating part) 35b. The numerals 34 and 33h indicate the same as mentioned above.

It is noted here that the power calculating part 35a calculates a first signal power (variable "pow (0)") using the post-loss voice packet accumulated in the receive-packet buffer 34, and calculates a second signal power (variable "pow (1)") using the pre-loss voice packet accumulated in the output-packet buffer 33h. Also, the power fluctuation calculating part 35b calculates the power fluctuation characteristics of the lost segment based on the first signal power and the second signal power calculated by the power calculating part 35a.

Covering the power calculating part 35a above in further detail, it calculates the pre-loss signal power "pow (0)" and the post-loss signal power "pow (1)" using, respectively, "revbuf" inputted from the receive-packet buffer 34 and "outbuf" inputted from the output-packet buffer 33h as indicated by Formula (F10), and outputs the calculated values to the power fluctuation calculating part 35b.

$$pow(0) = \sum_{i=N}^{2N-1} outbuf(i)^2 \quad (F10)$$

$$pow(1) = \sum_{i=0}^{N-1} revbuf(i)^2$$

where "i" represents an integer of 0 or more, while "Σ" a sum. That is, "pow (0)" indicates a sum of "outbuf (i)$^2$" from N to 2N−1, while "pow (1)" indicates a sum of "revbuf (i)$^2$" from 0 to N−1.

Also, the power fluctuation calculating part 35b calculates the power fluctuation characteristics of the lost segment based on "pow (0)" and "pow (1)" calculated by the power calculating part 35a. To be concrete, the power fluctuation calculating part 35b calculates the power fluctuation characteristics "rpow" of the lost voice packet segment using "pow (0)" and "pow (1)" as indicated by Formula (F11), and outputs the calculated value to the power fluctuation adding section 33f.

$$rpow=\sqrt{pow(1)/pow(0)} \quad (F11)$$

It is noted that in the case there is accumulated no post-loss voice packet in the receive-packet buffer 34, the power fluctuation estimating section 33c can also use the pre-loss voice packet accumulated in the output-packet buffer 33h to obtain the power fluctuation characteristics. This allows a more natural voice to be obtained.

(3-5) Pitch Fluctuation Estimating Section 33d

Figure 7:
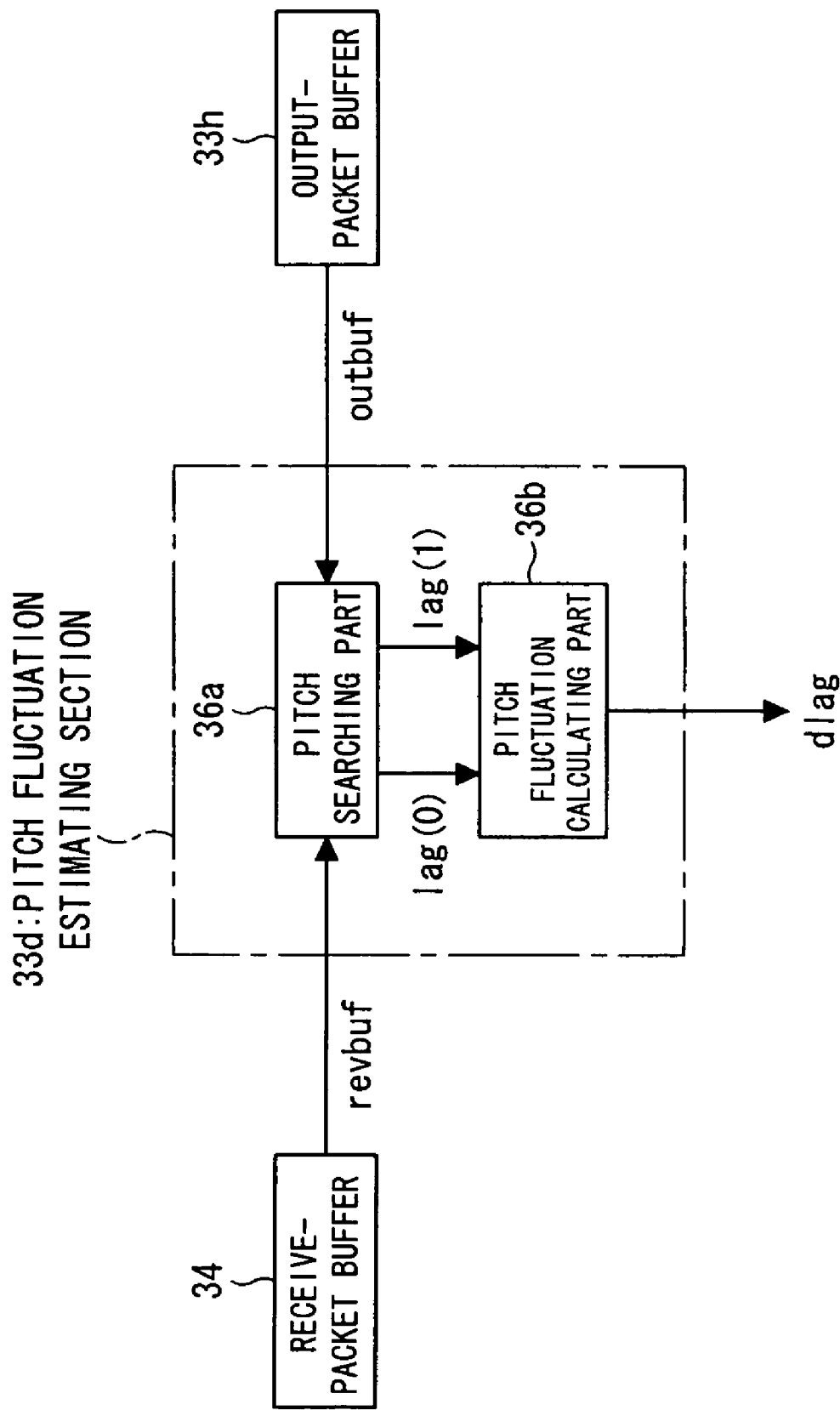
FIG. 7 is a block diagram of a pitch fluctuation estimating section according to the first embodiment of the present invention.

FIG. 7 is a block diagram of the pitch fluctuation estimating section 33d according to the first embodiment of the present invention. The pitch fluctuation estimating section 33d shown in FIG. 7 comprises a pitch searching part 36a and a pitch fluctuation calculating part (pitch fluctuation characteristics calculating part) 36b. It is noted that the numerals 34 and 33h indicate the same as mentioned above.

A calculation method for pitch fluctuation characteristics "dlag" will hereinafter be described.

The pitch searching part 36a shown in FIG. 7 searches a first pitch cycle "lag (0)" using the post-loss voice packet accumulated in the receive-packet buffer 34, and searches a second pitch cycle "lag (1)" using the pre-loss voice packet accumulated in the output-packet buffer 33h.

Then, the pitch searching part 36a searches "k (kmax0 and kmax1)" that maximize, respectively, R0 (k) and R1 (k) shown in Formula (F12), and outputs "kmax0" and "kmax1" searched to the pitch fluctuation calculating part 36b, respectively, as pitch cycles "lag (0)" and "lag (1)".

It is noted that the range to be searched for "k" (LAGMIN to LAGMAX) can be set desirably, e.g., between 20 and 120 samples.

$$R0(k) = \sum_{i=0}^{N-1} outbuf(i+N)outbuf(i+N-k) \quad (F12)$$

$$k = LAGMIN, \ldots, LAGMAX$$

$$R1(k) = \sum_{i=0}^{N-1} revbuf(i)revbuf(i+k)$$

-continued $$k = LAGMIN, \ldots, LAGMAX$$

$$lag(0) = k\max 0$$

$$lag(1) = k\max 1$$

where $\Sigma$ indicates a sum from 0 to N−1.

Accordingly, when estimating the pitch fluctuation, the pitch fluctuation calculating part 36b calculates the pitch cycle "lag (0)" using a signal for two packets (2N samples) before the lost segment, while the pitch cycle "lag (1)" using a signal for two packets (2N samples) after the lost segment.

Thus, it is possible to search a pitch in the segments before and after the lost segment, which allows an interpolation of great precision, resulting in voice quality improvement.

Further, the pitch fluctuation calculating part 36b calculates the pitch fluctuation characteristics "dlag" using inputted "lag (0)" and "lag (1)", as indicated by Formula (F13), and outputs a pitch fluctuation estimated value to the pitch signal generating section 33e.

$$dlag(i) = ILAG\{lag(0), lag(1), i\} \, i = 0, \ldots, N-1 \quad \text{(F13)}$$

where ILAG { } is an interpolation function, with which the pitch fluctuation characteristics "dlag" for each sample from the pre-loss pitch cycle "lag (0)" to the post-loss pitch cycle "lag (1)" is to be outputted. The pitch fluctuation calculating part 36b can also use a desired interpolation function, e.g., linear function or quadratic function. Further, N represents the number of samples in a frame.

It is noted that in the case there is accumulated no post-loss voice packet in the receive-packet buffer 34, the pitch fluctuation estimating section 33d can also use the pre-loss voice packet accumulated in the output-packet buffer 33h to obtain the pitch fluctuation characteristics.

(3-6) Pitch Signal Generating Section 33e

The pitch signal generating section 33e generates a pitch signal "pitsig" having the pitch fluctuation characteristics "dlag".

$$pitsig(l) = pitsig(l - dlag(l)) \, l = 0, \ldots, N-1 \quad \text{(F14)}$$

where $$pitsig(l) = outbuf(N+l) \, l = -N, \ldots, -1 \quad \text{(F15)}$$

That is, the pitch signal generating section 33e segments and uses a preceding pitch signal that corresponds to the pitch cycle represented by "dlag (1)" for each sample from "outbuf". Here, in the case there is no preceding pitch signal that corresponds to the pitch cycle in "outbuf", the pitch signal generating section 33e generates a pitch signal using a portion of "pitsig (l) (l>0)" that has already been generated, while in the case "dlag" is not an integer, generates a preceding pitch signal that corresponds to the non-integral pitch cycle by means of, for example, an interpolation from surrounding samples.

(3-7) Power Fluctuation Adding Section 33f

The power fluctuation adding section 33f adds the power fluctuation characteristics "rpow" to the pitch signal "pitsig" using Formula (F16) and calculates a loss concealment signal "cpk".

$$cpk(l) = \left(1.0 + \frac{rpow - 1.0}{N} l\right) pitsig(l) \quad l = 0, \ldots, N-1 \quad \text{(F16)}$$

where "/N" indicates a division by N.

It is noted here that the power fluctuation adding section 33f outputs a loss concealment packet CPK having "cpk" as an element to the output packet switching section 33g.

$$CPK(m) = \{cpk(0), cpk(1), \ldots, cpk(N-1)\} \quad \text{(F17)}$$

(3-8) Output Packet Switching Section 33g

The output packet switching section 33g switches the output voice packet OPK in accordance with the voice packet loss determination result "eflag" as indicated by Formula (F18).

$$OPK(m) = \begin{cases} PK(m), & eflag = 0 \\ CPK(m), & eflag = 1 \end{cases} \quad \text{(F18)}$$

That is, the output packet switching section 33g outputs a loss concealment packet when a voice packet loss is detected, otherwise outputs a normal voice packet outputted from the receive-packet buffer 34.

Accordingly, the receiving terminal 30 of the present invention has been adapted to comprise the receive-packet buffer 34 for accumulating voice packets; the packet loss determining section 33b for detecting the loss of a packet using the voice packets accumulated in the receive-packet buffer 34; the output-packet buffer 33h for accumulating preceding output voice packets; the pitch fluctuation estimating section 33d for estimating the pitch fluctuation characteristics of the lost voice packet based on post-loss voice packets received after the lost segment among the voice packets accumulated in the receive-packet buffer 34 and pre-loss voice packets for 2N samples received before the lost segment among the voice packets accumulated in the output-packet buffer 33h; the power fluctuation estimating section 33c for estimating the power fluctuation characteristics of the lost voice packet based on the post-loss voice packets and the pre-loss voice packets; the pitch signal generating section 33e for generating a pitch signal having the pitch fluctuation characteristics estimated by the power fluctuation estimating sections 33c; the power fluctuation adding section 33f for outputting the pitch signal generated by the pitch signal generating section 33e, with the power fluctuation characteristics estimated by the power fluctuation estimating section 33c being added thereto, as a loss concealment packet; and the output packet switching section 33g for selectively outputting the loss concealment packet outputted from the power fluctuation adding section 33f or a received voice packet based on a detection signal from the packet loss determining section 33b.

This allows abnormal noise due to mismatch of pitch cycle and feeling of mute due to signal power attenuation to be suppressed, and subjective deterioration of both naturalness and continuity due to voice packet loss to be improved.

Thus, in the first embodiment, when there occurs a voice packet loss, using voice packets that have arrived at the receive-packet buffer, the pitch cycle and the power fluctuation of a lost segment are estimated using voice packets before and after the voice packet lost segment. Therefore, it is possible to make a more accurate estimation in comparison with the prior art that estimates using only a pre-loss voice packet.

In addition, the receive-packet buffer 34 is essentially provided to absorb voice packet transmission delay fluctuation, whereby the delay for compensating for fluctuation in the receive-packet buffer 34 is originally accepted. Therefore, no other increase in the amount of delay due to the voice packet loss concealment method of the present invention occurs.

Thus, without an additional increase in transmission delay, using a pre-loss normal voice packet, it is possible to generate a loss concealment packet having a smooth pitch fluctuation characteristic and a smooth power fluctuation characteristic to a post-loss normal voice packet, which allows abnormal noise due to pitch cycle mismatch and feeling of mute due to signal power attenuation to be suppressed, and subjective deterioration of both naturalness and continuity due to voice packet loss to be further improved in comparison with the prior art.

(B) Description of a Second Embodiment of the Present Invention

Figure 8:
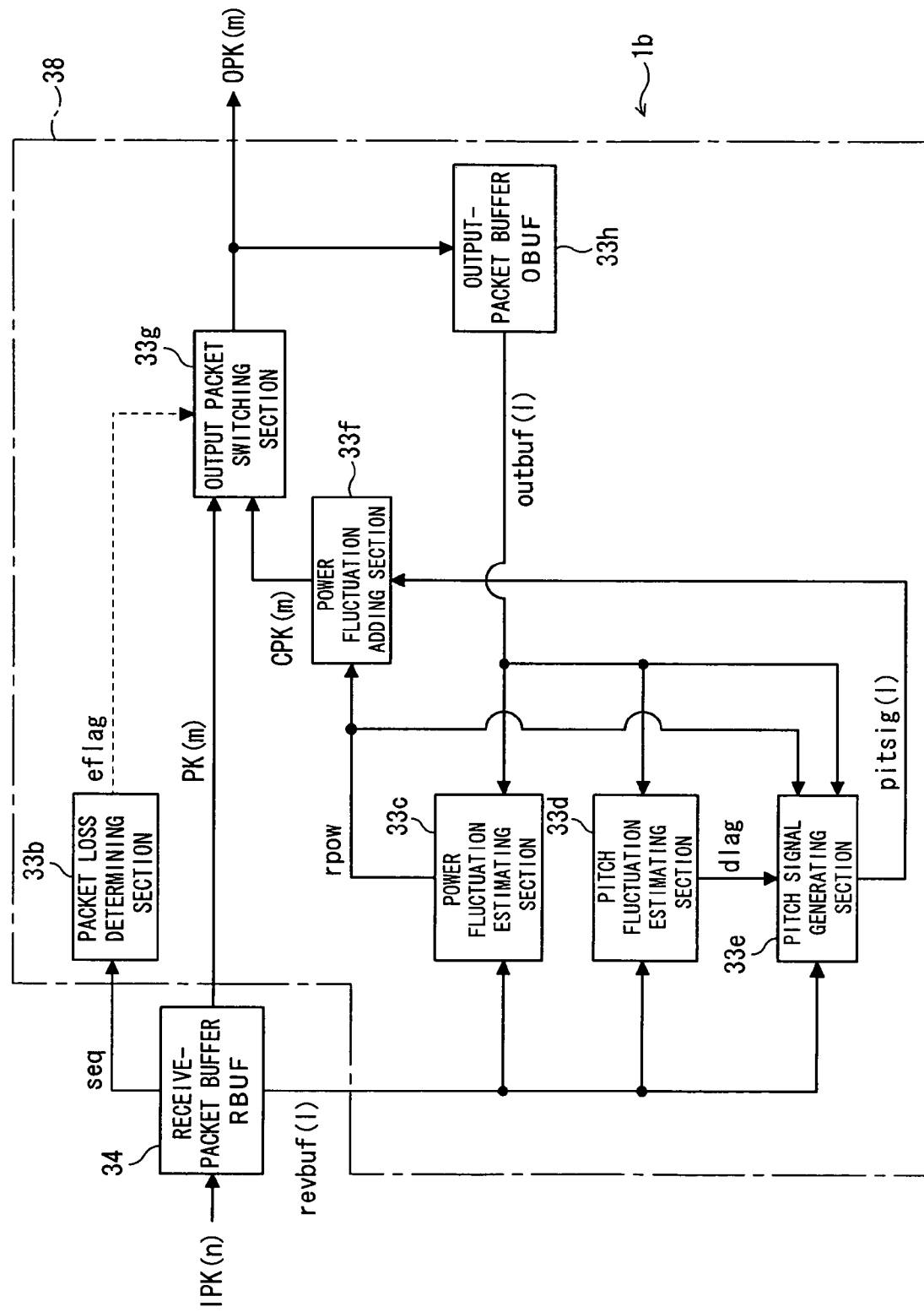
FIG. 8 is a block diagram of a voice packet loss concealment device according to a second embodiment of the present invention.

FIG. 8 is a block diagram of a voice packet loss concealment device according to a second embodiment of the present invention. A pitch signal generating section 33e of the voice packet loss concealment device 1b shown in FIG. 8 is adapted to output a pitch signal by multiplying a predetermined weighting coefficient to each of the pre-loss and post-loss power fluctuation characteristics, and adding the weighted pre-loss and post-loss power fluctuation characteristics to each other.

It is noted that elements shown in FIG. 8 having the same numerals as in the first embodiment are the same as mentioned above, and that redundant descriptions will be omitted to explain mainly the operation of the pitch signal generating section 33e.

The pitch signal generating section 33e generates a pitch signal "pitsig0" corresponding to the pitch fluctuation characteristics "dlag" based on a pre-loss voice signal "outbuf", as indicated by Formula (F19A).

$$pitsig0(l)=pitsig0(l-dlag(l)) \quad l=0,\ldots,N-1 \quad (F19A)$$

where $$pitsig0(l)=outbuf(N+l) \quad l=-N,\ldots,-1 \quad (F20A)$$

and the method of generating a lost packet is the same as in the first embodiment.

Next, the pitch signal generating section 33e generates a pitch signal by adding a pre-loss voice packet with a first weighting coefficient being multiplied thereto and a post-loss voice packet with a second weighting coefficient being multiplied thereto. That is, the pitch signal generating section 33e outputs a composite pitch signal obtained by adding: a first pitch signal obtained using the pre-loss voice packet, with the first weighting coefficient due to the power fluctuation characteristics estimated by the power fluctuation estimating section 33c being multiplied thereto; and a second pitch signal obtained using the post-loss voice packet, with the second weighting coefficient due to the power fluctuation characteristics estimated by the power fluctuation estimating section 33c being multiplied thereto, as the pitch signal.

To be concrete, the pitch signal generating section 33e generates a pitch signal "pitsig1" corresponding to the pitch fluctuation characteristics "dlag" based on a post-loss voice signal "revbuf", as indicated by Formula (F19B).

$$pitsig1(l)=pitsig1(l+dlag(l)) \quad l=N-1,\ldots,0 \quad (F19B)$$

where $$pitsig1(l)=revbuf(l-N) \quad l=N,\ldots,2N-1 \quad (F20B)$$

That is, the pitch signal generating section 33e segments and uses a following pitch signal (i.e., future in terms of time) that corresponds to the pitch cycle represented by "dlag (1)" for each sample from "revbuf". Also, in the case there is no following pitch signal that corresponds to the pitch cycle in "revbuf", the pitch signal generating section 33e generates a pitch signal using a portion of "pitsig (l) (l<N)" that has already been generated, while in the case "dlag" is not an integer, generates a following pitch signal that corresponds to the non-integral pitch cycle by means of, for example, an interpolation from surrounding samples.

Next, a weighting addition is applied to "pitsig0" and "pitsig1" using Formula (F21) to generate a composite pitch signal "pitsig".

$$pitsig(l)=(1-w)pitsig0(l)+w \, pitsig1(l) \quad (F21)$$

where "w" represents a weighting coefficient, which can be switched in accordance with the power fluctuation characteristics "rpow". Although it is possible to use a desired switching method, in the second embodiment will be performed a switching operation under the following policy.

When there occurs a loss in the rise part of a voice (first transition segment from non-voice to voice), the signal in the lost segment shows a stronger correlation with a post-loss signal (voice signal) than with a pre-loss signal (non-voice signal). In such case, the pitch signal generating section 33e sets "w" to 0.5 or more to increase and add the weight of a loss concealment signal that is generated based on the post-loss signal.

Therefore, the composite pitch signal is obtained by switching various weighting coefficients, resulting in voice quality improvement. Moreover, an appropriate pitch signal that takes voice data into consideration can be obtained, generating a natural voice that fluctuates smoothly. Also, the composite pitch signal is obtained by switching various weighting coefficients, resulting in further voice quality improvement.

Additionally, the pitch signal generating section 33e is arranged to generate the pitch signal by applying a weighting addition to each of the pitch fluctuation characteristics and the power fluctuation characteristics of the post-loss voice packet in the case the lost segment corresponds to the first transition segment from one including no voice to another including the rise of the voice.

Thus, in the second embodiment, it is possible to generate a signal more approximate to the original signal than a loss concealment signal generated from a pre-loss signal as in the first embodiment, which allows deterioration of naturalness and continuity in voice segments to be further suppressed.

In the second embodiment, the pitch signal generating section 33e can improve the voice quality in the rise part by setting the weighting coefficient "w" to 0.5 or more in, for example, the case of a "rpow" higher than a threshold value RP_TH (i.e., a drastic power increase), while setting "w" to 0.0 in the case of one lower than the threshold value.

Thus, generating pitch signals, respectively, from pre-loss and post-loss signals and then applying a weighting addition to them make it possible to conceal voice packet loss in the rise part, etc. of the voice, resulting in further voice quality improvement.

(c) Description of a Third Embodiment of the Present Invention

Figure 9:
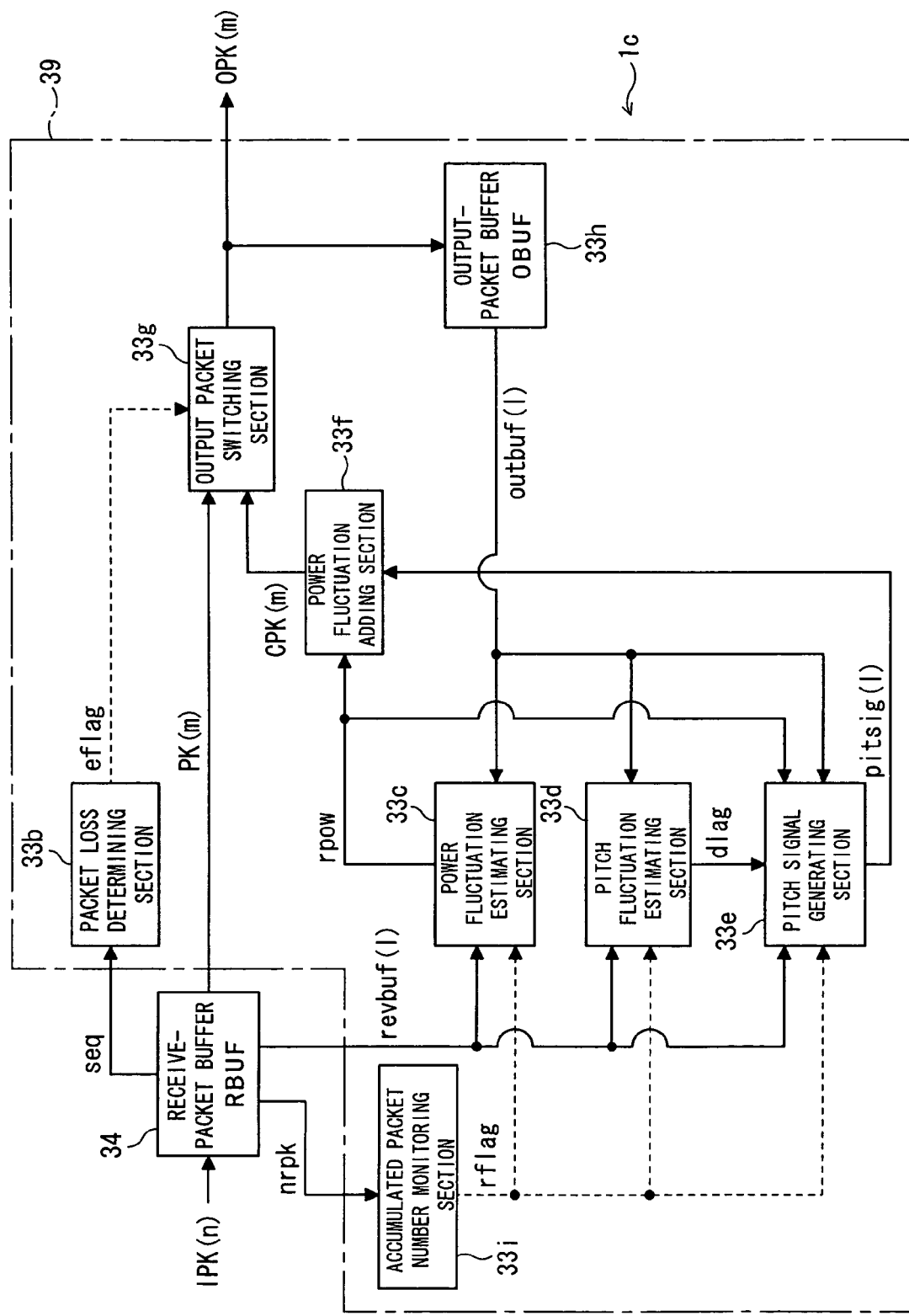
FIG. 9 is a block diagram of a voice packet loss concealment device according to a third embodiment of the present invention.

FIG. 9 is a block diagram of a voice packet loss concealment device according to a third embodiment of the present invention. The voice packet loss concealment device 1c shown in FIG. 9 has a monitor function for monitoring the number of voice packets accumulated in a receive-packet buffer 34, and a function for changing the operation pattern (operation mode) of a pitch fluctuation estimating section 33d, a power fluctuation estimating section 33c, and a pitch signal generating section 33e in accordance with the number of voice packets acquired by the monitor function. Functions other than above are the same as that of the voice packet loss concealment device 1b of the second embodiment. Also, elements shown in FIG. 9 having the same numerals as above are the same as mentioned above. Descriptions about the same elements as in the second embodiment will hereinafter be omitted to describe the operation of different elements.

An accumulated packet number monitoring section 33i shown in FIG. 9 outputs a selection signal that indicates one of either pre-loss voice packet or post-loss voice packet based on the number of voice packets accumulated in the receive-packet buffer 34.

To be concrete, the accumulated packet number monitoring section 33i is provided with the number of voice packets "nrpk" stored in the receive-packet buffer 34, and outputs a flag "rflag" to each of the pitch fluctuation estimating section 33d, the power fluctuation estimating section 33c, and the pitch signal generating section 33e in accordance with "nrpk", as indicated by Formula (F22).

$$if(nrpk==0) rflag=0$$

$$else\ rflag=0 \qquad (F22)$$

In the case of "rflag=1", the pitch fluctuation estimating section 33d calculates only a pitch cycle "lag (1)" of the post-loss segment in a pitch searching part 36a (refer to FIG. 7) by means of the same method as the first embodiment. Then, the pitch fluctuation calculating part 36b calculates the pitch fluctuation characteristics "dlag" using Formula (F23), and outputs a calculated value to the pitch signal generating section 33e.

$$dlag(i)=OILAG\{old\_lag,\ lag(1),i\}i=0,\ldots,N-1 \qquad (F23)$$

where "old_lag" represents a preceding calculated "lag (1)" (immediately before), which is updated using Formula (F24) after every calculation of Formula (F23).

$$old\_lag=lag(1) \qquad (F24)$$

Also, OILAG { } indicates an extrapolation function, wherein the pitch fluctuation calculating part 36b changes the pitch cycle from "old_lag" in the pre-loss segment to "lag(1)" to extrapolate and output the pitch fluctuation characteristics "dlag" for each sample after the change of pitch cycle (lost segment). It is possible to use a desired extrapolation function, e.g., linear function or quadratic function.

Thus, the accumulated packet number monitoring section 33i inputs the flag "rflag", which indicates a process pattern according to the number of voice packets accumulated in the receive-packet buffer 34, to each of the pitch fluctuation estimating section 33d, the power fluctuation estimating section 33c, and the pitch signal generating section 33e. That is, the accumulated packet number monitoring section 33i can control the pitch fluctuation estimating section 33d, the power fluctuation estimating section 33c, and the pitch signal generating section 33e respectively according to the number of voice packets.

Next, in the case of "rflag=1", the power fluctuation estimating section 33c calculates only a power "pow (1)" of the post-loss segment in a power calculating part 35a (refer to FIG. 6) by means of the same method as the first embodiment. Then, the power fluctuation estimating section 33c calculates the power fluctuation characteristics "rpow" using Formula (F25).

$$rpow=\sqrt{pow(1)}/old\_pow \qquad (F25)$$

where "old_pow" represents a preceding calculated "pow (1)" (immediately before), which is updated using Formula (F26) after every calculation of Formula (F25).

$$old\_pow=pow(1) \qquad (F26)$$

In the case of "rflag=1", the pitch signal generating section 33e generates a pitch signal "pitsig" having the pitch fluctuation characteristics "dlag" by means of the same method as the first embodiment, as indicated by Formula (F27). That is, the pre-loss signal is only be used.

$$pitsig(l)=pitsig(l-dlag(l))l=0,\ldots,N-1 \qquad (F27)$$

where $$pitsig(l)=outbuf(N+l)l=-N,\ldots,-1 \qquad (F28)$$

Meanwhile, in the case of "rflag=0", the pitch fluctuation estimating section 33d, the power fluctuation estimating section 33c, and the pitch signal generating section 33e all perform the same processing as that in the second embodiment.

Thus, it is possible to generate a loss concealment signal using the pre-loss voice packet even in the case where no voice packet is accumulated in the receive-packet buffer 34 due to, for example, burst transmission delay fluctuation.

It is noted that when a burst consecutive loss processing is required, to prevent an extreme reduction in estimation accuracy for the pitch fluctuation and power fluctuation, the pitch signal generating section 33e attenuates the loss concealment signal gradually to minimize auditory deterioration.

Figure 10:
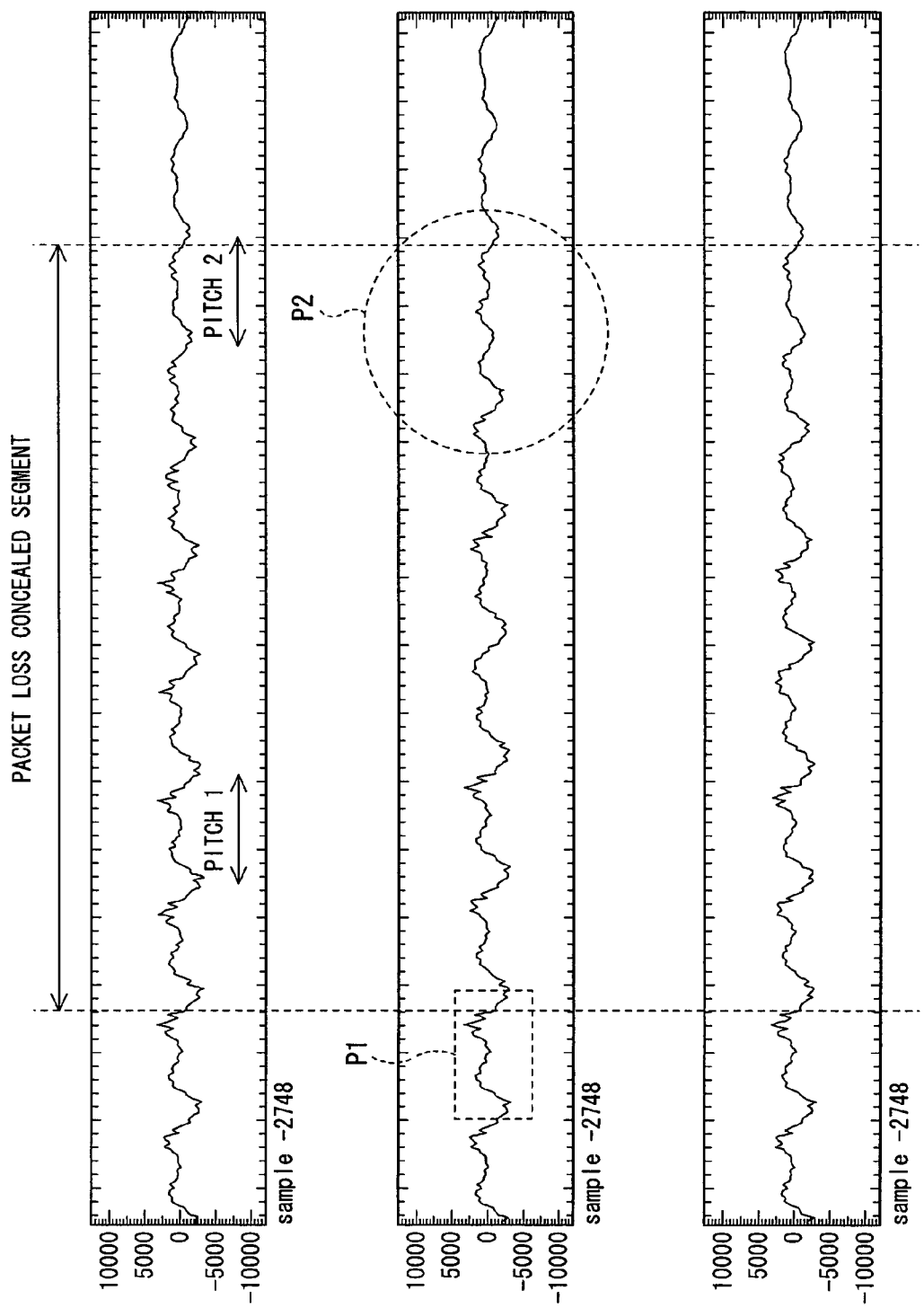
FIGS. 10(*a*) to 10(*c*) are views showing a first example of processed waveforms to which a voice packet loss concealment method of the present invention has been applied.
Figure 11:
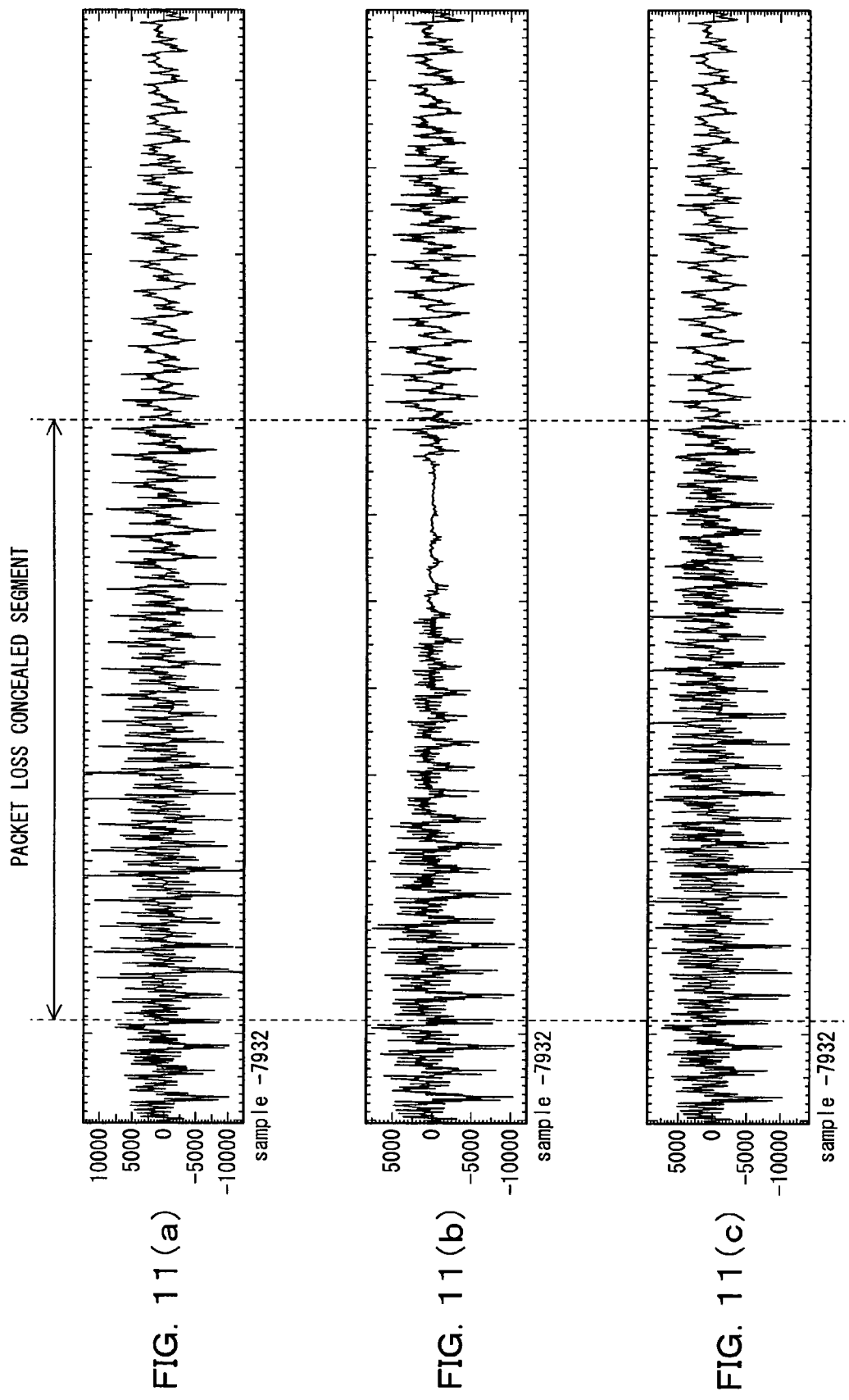
FIGS. 11(*a*) to 11(*c*) are views showing a second example of processed waveforms to which a voice packet loss concealment method of the present invention has been applied.
Figure 12:
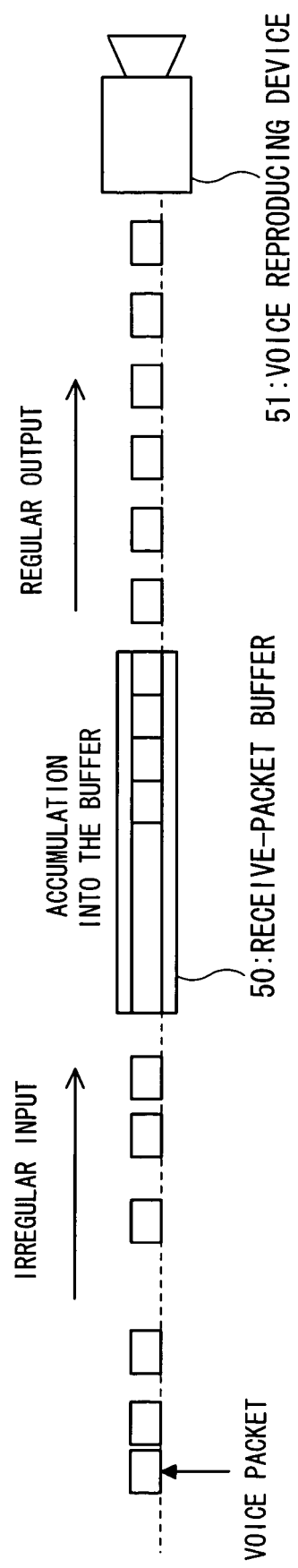
FIG. 12 is an illustrative view of voice packet transmission delay fluctuation.

A resultant example of processed waveforms obtained by using a voice packet loss concealment method will hereinafter be described with reference to FIGS. 10(a) to 10(c) for pitch fluctuation, while FIGS. 11(a) to 11(c) for power fluctuation. Here, both FIGS. 10(a) and 11(a) show original voice waveforms. Both FIGS. 10(b) and 11(b) show processed waveforms according to the publicly known document 1 (G.711 Appendix I), while both FIGS. 10(c) and 11(c) show processed waveforms obtained by using the present voice packet loss concealment method. Additionally, in each waveform is indicated a packet loss concealed segment.

The waveform shown in FIG. 10(a) is an original voice waveform without voice packet loss. In the waveform shown in FIG. 10(a) appears a characteristic shape repeatedly. Also, the time interval between "peaks" or "troughs" of the repeating waveform unit corresponds to a pitch cycle (pitch cycle 1, pitch cycle 2). Here, the pitch cycle includes fluctuation and thereby changes slightly from pitch cycle 1 to pitch cycle 2 as shown in FIG. 10(a).

In the packet loss concealed segment in the waveform shown in FIG. 10(b) is inserted a pseudo waveform having the same shape as a partial waveform indicated as P1 repeatedly.

Here, when receiving a pitch cycle in the packet loss concealed segment similar to that of the partial waveform P1, the voice packet loss concealment device 1 (1a to 1c) inserts the same partial waveform P1 repeatedly based on prediction.

It is noted here that there occurs a pitch cycle shift against the original voice signal, resulting in a pitch cycle mismatch at the connection between the packet loss concealed segment and the normal signal segment thereafter (dashed portion indicated as P2).

In contrast thereto, the waveform shown in FIG. 10(c) is for the case where the post-loss pitch cycle (pitch cycle 2) is shorter than the pre-loss pitch cycle (pitch cycle 1), being adapted in such a manner that the pitch cycle in the lost segment gets close to that of the post-loss signal. The gradual pitch cycle reduction suppresses pitch cycle shift to improve the mismatch at the connection. In addition, this allows abnormal noise to be eliminated also subjectively.

That is, the pitch fluctuation calculating part 36b generates a concealment signal in such a manner as to change from the pre-loss pitch cycle to the post-loss pitch cycle, whereby the pitch cycle of the loss concealed segment changes for each pitch (to be more accurate, for each sample). The pitch fluctuation calculating part 36b generates a signal corresponding to this pitch fluctuation and calculates a pitch lag value for each sample as indicated by Formula (F13).

For this processing, the prior art uses an identical pitch cycle constantly, and therefore the pitch peak of the waveform shown in FIG. 10(b) shifts rightward in comparison with the original voice waveform.

Next, in respect to power fluctuation, the waveform shown in FIG. 11(a) is an original voice waveform without voice packet loss. Here, the vertical axis indicates the voice amplitude.

The waveform shown in FIG. 11(b) shows an amplitude fluctuation wherein the amplitude attenuates gradually to fade out.

In contrast thereto, in the waveform shown in FIG. 11(c) is generated a loss concealment signal in such a manner as to fluctuate to the amplitude after the connection (post-loss amplitude) gradually. Further, uncomfortable feeling due to drastic feeling of mute can be eliminated also subjectively.

Thus, the voice packet loss concealment devices 1, 1a to 1c can generate a concealment signal having a smooth pitch fluctuation characteristic and a smooth power fluctuation characteristic from a pre-loss normal voice packet to a post-loss normal voice packet. This allows abnormal noise due to pitch cycle mismatch and feeling of mute due to signal power attenuation to be suppressed, and subjective deterioration of both naturalness and continuity due to voice packet loss to be further improved in comparison with the prior art.

(D) Others

The present invention is not restricted to the above-described embodiments and variants thereof, but there may be many modifications without departing from the scope of the invention.

Communication systems or networks to which the present invention is applied are not restricted to VoIP communication system, but may encompass, for example, VoATM in an ATM (Asynchronous Transfer Mode) network and VoFR that utilizes a high-speed digital line via an FR (Frame Relay) exchange.

VoATM and VoFR transmit packets via a gateway for packetizing telephone voice, etc., allowing a real-time voice communication.

For example, using VoATM improves voice quality, and allows transmission delay, transmission delay fluctuation, or voice packet loss to be improved considerably. Further, using VoFR can obtain relatively high-level voice quality with a low cost.

INDUSTRIAL APPLICABILITY

As described heretofore, in accordance with the voice packet loss concealment device, the voice packet loss concealment method, the receiving terminal, and the voice communication system of the present invention, the waveforms of a loss concealment packet and a voice packet received normally after a packet loss are connected smoothly, which allows both abnormal noise due to pitch cycle mismatch and feeling of mute due to signal power attenuation to be suppressed, and subjective deterioration of auditory naturalness and continuity caused by voice packet loss to be improved.

What is claimed is:

1. A voice packet loss concealment device comprising:
an estimating section for estimating voice characteristics that are pitch and power characteristics of a voice packet lost segment using both a pre-loss voice packet received before said lost segment and a post-loss voice packet received after said lost segment;
a pitch signal generating section for generating a pitch signal having the pitch characteristics estimated by said estimating section; and
a lost packet generating section for outputting said pitch signal generated by said pitch signal generating section, with the power characteristics estimated by said estimating section being added thereto, as a loss concealment packet,
wherein said pitch signal generating section outputs a composite pitch signal obtained by adding:
a first pitch signal obtained using said post-loss voice packet, with a first weighting coefficient due to the power characteristics estimated by said estimating section being multiplied thereto; and
a second pitch signal obtained using said pre-loss voice packet, with a second weighting coefficient due to the power characteristics estimated by said estimating section being multiplied thereto, as said pitch signal.

2. The voice packet loss concealment device according to claim 1, wherein said estimating section estimates a third pitch fluctuation characteristic of said lost segment and a third power fluctuation characteristic of said lost segment as the voice characteristics, using a first pitch fluctuation characteristic of said post-loss voice packet and a first power fluctuation characteristic of said post-loss voice packet, and a second pitch fluctuation characteristic of said pre-loss voice packet and a second power fluctuation characteristic of said pre-loss voice packet.

3. The voice packet loss concealment device according to claim 1, comprising a receive buffer for accumulating received voice packets, wherein said receive buffer is used as an absorption buffer for absorbing packet transmission delay fluctuation.

4. The voice packet loss concealment device according to claim 3, comprising an accumulated packet number monitoring section for outputting a selection signal that indicates one of either pre-loss voice packet or post-loss voice packet based on the number of voice packets accumulated in said receive buffer.

5. The voice packet loss concealment device according to claim 3, further comprising an output buffer for accumulating one or more voice packets required for voice processing among the voice packets accumulated in said receive buffer, wherein said estimating section estimates the voice characteristics using said post-loss voice packet accumulated in said receive buffer and said pre-loss voice packet accumulated in said output buffer.

6. A voice packet loss concealment device comprising:
a receive buffer for accumulating voice packets;
a detecting section for detecting the loss of a voice packet and outputting information relating to a lost segment;
an output buffer for accumulating one or more voice packets required for voice processing among the voice packets accumulated in said receive buffer;
a pitch fluctuation characteristics estimating section for estimating pitch fluctuation characteristics of said lost segment based on a post-loss voice packet received after said lost segment among the voice packets accumulated in said receive buffer and a pre-loss voice packet received before said lost segment among one or more voice packets accumulated in said output buffer;
a power fluctuation characteristics estimating section for estimating power fluctuation characteristics of said lost segment based on said post-loss voice packet and said pre-loss voice packet;
a pitch signal generating section for generating a pitch signal having the pitch fluctuation characteristics estimated by said pitch fluctuation characteristics estimating section; and
a lost packet generating section for outputting said pitch signal generated by said pitch signal generating section, with the power fluctuation characteristics estimated by said power fluctuation characteristics estimating section being added thereto, as a loss concealment packet,
wherein said pitch signal generating section outputs a composite pitch signal obtained by adding:
a first pitch signal obtained using said post-loss voice packet, with a first weighting coefficient due to the power fluctuation characteristics estimated by said power fluctuation characteristics estimating section being multiplied thereto; and
a second pitch signal obtained using said pre-loss voice packet, with a second weighting coefficient due to the power fluctuation characteristics estimated by said power fluctuation characteristics estimating section being multiplied thereto, as said pitch signal.

7. The voice packet loss concealment device according to claim 6, wherein said pitch fluctuation characteristics estimating section comprises:
a pitch searching part for searching a first pitch cycle using said post-loss voice packet accumulated in said receive buffer and a second pitch cycle using said pre-loss voice packet accumulated in said output buffer; and
a pitch fluctuation characteristics calculating part for calculating the pitch fluctuation characteristics of said lost segment based on said first pitch cycle and said second pitch cycle searched by said pitch searching part, and outputting a pitch fluctuation estimated value.

8. The voice packet loss concealment device according to claim 6, wherein said power fluctuation characteristics estimating section comprises:
a signal power calculating part for calculating a first signal power using said post-loss voice packet accumulated in said receive buffer and a second signal power using said pre-loss voice packet accumulated in said output buffer; and
a power fluctuation characteristics calculating part for calculating the power fluctuation characteristics of said lost segment based on said first signal power and said second signal power calculated by said signal power calculating part.

9. The voice packet loss concealment device according to claim 6, comprising:
an output packet switching section for selectively outputting said loss concealment packet outputted from said lost packet generating section or a received normal voice packet from said receive buffer based on a determination signal outputted from said detecting section, indicating whether or not there is any voice packet loss.

10. The voice packet loss concealment device according to claim 9, wherein said pitch signal generating section extracts a pitch signal, which is contained in said post-loss voice packet accumulated in said receive buffer or said pre-loss voice packet accumulated in said output buffer, in accordance with a pitch fluctuation estimated value estimated by said pitch fluctuation characteristics estimating section.

11. The voice packet loss concealment device according to claim 9, wherein said pitch signal generating section generates said pitch signal by applying a weighting addition to each of the pitch fluctuation characteristics and the power fluctuation characteristics of said post-loss voice packet in the case said lost segment corresponds to the first transition segment from one including no voice to another including the rise of said voice.

12. The voice packet loss concealment device according to claim 9, wherein said pitch fluctuation characteristics estimating section obtains the pitch fluctuation characteristics using said pre-loss voice packet accumulated in said output buffer in the case there is accumulated no post-loss voice packet in said receive buffer.

13. The voice packet loss concealment device according to claim 9, wherein said power fluctuation characteristics estimating section obtains the power fluctuation characteristics using said pre-loss voice packet accumulated in said output buffer in the case there is accumulated no post-loss voice packet in said receive buffer.

14. A voice packet loss concealment device comprising:
a receive buffer for accumulating voice packets;
a packet loss determining section for detecting the loss of a packet using the voice packets accumulated in said receive buffer;
an output-packet buffer for accumulating one or more voice packets required for voice processing among the voice packets accumulated in said receive buffer;
a pitch fluctuation characteristics estimating section for estimating pitch fluctuation characteristics of said lost voice packet based on a post-loss voice packet received after said lost segment among the voice packets accumulated in said receive buffer and a pre-loss voice packet received before said lost segment among one or more voice packets accumulated in said output buffer;
a power fluctuation characteristics estimating section for estimating power fluctuation characteristics of said lost voice packet based on said post-loss voice packet and said pre-loss voice packet;
a pitch signal generating section for generating a pitch signal having the pitch fluctuation characteristics estimated by said pitch fluctuation characteristics estimating sections;
a lost packet generating section for outputting said pitch signal generated by said pitch signal generating section, with the power fluctuation characteristics estimated by said power fluctuation characteristics estimating section being added thereto, as a loss concealment packet; and an output packet switching section for selectively outputting said loss concealment packet outputted from said lost packet generating section or a received normal voice packet from said receive buffer based on a detection signal from said detecting section, wherein said pitch signal generating section outputs a composite pitch signal obtained by adding:
- a first pitch signal obtained using said post-loss voice packet, with a first weighting coefficient due to the power fluctuation characteristics estimated by said power fluctuation characteristics estimating section being multiplied thereto; and
- a second pitch signal obtained using said pre-loss voice packet, with a second weighting coefficient due to the power fluctuation characteristics estimated by said power fluctuation characteristics estimating section being multiplied thereto, as said pitch signal.

15. A voice communication system in which voice data is packetized and transmitted, wherein a receiving terminal for receiving voice packets containing said voice data comprises:
- a detecting section for detecting the loss of a voice packet and outputting information relating to a lost segment;
- an estimating section for estimating voice characteristics that are pitch and power characteristics of said lost segment using both a pre-loss voice packet received before said lost segment that is detected by said detecting section and a post-loss voice packet received after said lost segment;
- a pitch signal generating section for generating a pitch signal having the pitch characteristics estimated by said estimating section; and
- a lost packet generating section for outputting said pitch signal generated by said pitch signal generating section, with the power characteristics estimated by said estimating section being added thereto, as a loss concealment packet, wherein said pitch signal generating section outputs a composite pitch signal obtained by adding:
- a first pitch signal obtained using said post-loss voice packet, with a first weighting coefficient due to the power characteristics estimated by said estimating section being multiplied thereto; and
- a second pitch signal obtained using said pre-loss voice packet, with a second weighting coefficient due to the power characteristics estimated by said estimating section being multiplied thereto, as said pitch signal.

16. A receiving terminal in a voice communication system in which voice data is packetized and transmitted, comprising:
- a receive buffer for accumulating received voice packets;
- a detecting section for detecting the loss of a voice packet using the voice packets accumulated in said receive buffer and outputting information relating to a lost segment;
- an estimating section for estimating voice characteristics that are pitch and power characteristics of said lost segment using both a pre-loss voice packet received before said lost segment that is detected by said detecting section and a post-loss voice packet received after said lost segment;
- a pitch signal generating section for generating a pitch signal having the pitch characteristics estimated by said estimating section; and
- a lost packet generating section for outputting said pitch signal generated by said pitch signal generating section, with the power characteristics estimated by said estimating section being added thereto, as a loss concealment packet, wherein said pitch signal generating section outputs a composite pitch signal obtained by adding:
- a first pitch signal obtained using said post-loss voice packet, with a first weighting coefficient due to the power characteristics estimated by said estimating section being multiplied thereto; and
- a second pitch signal obtained using said pre-loss voice packet, with a second weighting coefficient due to the power characteristics estimated by said estimating section being multiplied thereto, as said pitch signal.

17. A voice packet loss concealment method in a receiving terminal provided in a voice communication system in which voice data is packetized and transmitted, the voice packet loss concealment method comprising:
- detecting loss of said voice packet and outputting a detection signal containing information relating to at least a lost segment;
- estimating voice characteristics that are pitch and power characteristics of said lost segment using voice packets received before and after a timing of said detected lost segment;
- generating a pitch signal having the estimated pitch characteristics; and
- outputting said generated pitch signal, with the estimated power characteristics being added thereto, as a loss concealment packet, wherein said generating step includes generating a composite pitch signal obtained by adding:
- a first pitch signal obtained using the received voice packets after the timing of said detected lost segment, with a first weighting coefficient due to the estimated power characteristics being multiplied thereto; and
- a second pitch signal obtained using the received voice packets before the timing of said detected lost segment, with a second weighting coefficient due to the estimated power characteristics being multiplied thereto, as said pitch signal.

18. The voice packet loss concealment method according to claim 17, wherein:
said estimating step includes estimating pitch fluctuation characteristics and power fluctuation characteristics of said lost segment using the voice packets before and after said lost segment among voice packets accumulated in a receive buffer that is provided to absorb transmission delay fluctuation in a transmission channel.

* * * * *